(12) United States Patent
Takayama

(10) Patent No.: US 9,088,729 B2
(45) Date of Patent: Jul. 21, 2015

(54) IMAGING APPARATUS AND METHOD OF CONTROLLING SAME

(71) Applicant: CANON KABUSHIKI KAISHA, Tokyo (JP)

(72) Inventor: Tomohiko Takayama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 83 days.

(21) Appl. No.: 13/786,560

(22) Filed: Mar. 6, 2013

(65) Prior Publication Data

US 2013/0250144 A1    Sep. 26, 2013

(30) Foreign Application Priority Data

Mar. 23, 2012 (JP) ................... 2012-067614

(51) Int. Cl.
- *H04N 5/225* (2006.01)
- *H04N 5/265* (2006.01)
- *H04N 5/232* (2006.01)
- *G02B 21/36* (2006.01)

(52) U.S. Cl.
CPC ............. *H04N 5/265* (2013.01); *G02B 21/367* (2013.01); *H04N 5/232* (2013.01); *H04N 5/23235* (2013.01); *H04N 5/23238* (2013.01)

(58) Field of Classification Search
CPC .......... H04N 5/23238; H04N 5/23235; H04N 5/3696
USPC ..................................... 348/218.1
See application file for complete search history.

(56) References Cited

U.S. PATENT DOCUMENTS

| | | | | |
|---|---|---|---|---|
| 7,456,377 B2 * | 11/2008 | Zeineh et al. | ............... | 250/201.3 |
| 7,653,260 B2 * | 1/2010 | Perz et al. | ............... | 382/284 |
| 8,452,082 B2 * | 5/2013 | Palum et al. | ............... | 382/162 |
| 2005/0281484 A1 * | 12/2005 | Perz et al. | ............... | 382/294 |
| 2006/0045505 A1 * | 3/2006 | Zeineh et al. | ............... | 396/89 |
| 2009/0087087 A1 * | 4/2009 | Palum et al. | ............... | 382/165 |

FOREIGN PATENT DOCUMENTS

| | | |
|---|---|---|
| JP | 2002-112095 | 4/2002 |
| JP | 2007-017930 | 1/2007 |
| JP | 2009-207188 | 9/2009 |
| JP | 2010-258885 | 11/2010 |

* cited by examiner

*Primary Examiner* — Ahmed A Berhan
(74) *Attorney, Agent, or Firm* — Fitzpatrick, Cella, Harper & Scinto

(57) ABSTRACT

An imaging apparatus images an imaging target region by dividing the imaging target region into a plurality of divided regions and generates a merged image of a larger region than the divided regions by merging the obtained images of the respective divided regions. A method of the imaging apparatus includes acquiring a first image and a second image in each of the plurality of divided regions, performing image alignment between adjacent divided regions using the second images, and generating the merged image by merging the first images of the adjacent divided regions based on a result of the alignment performed using the second images. The second image is an image in which a depth of field or a focusing position, or both, are different from those of the first image.

15 Claims, 31 Drawing Sheets

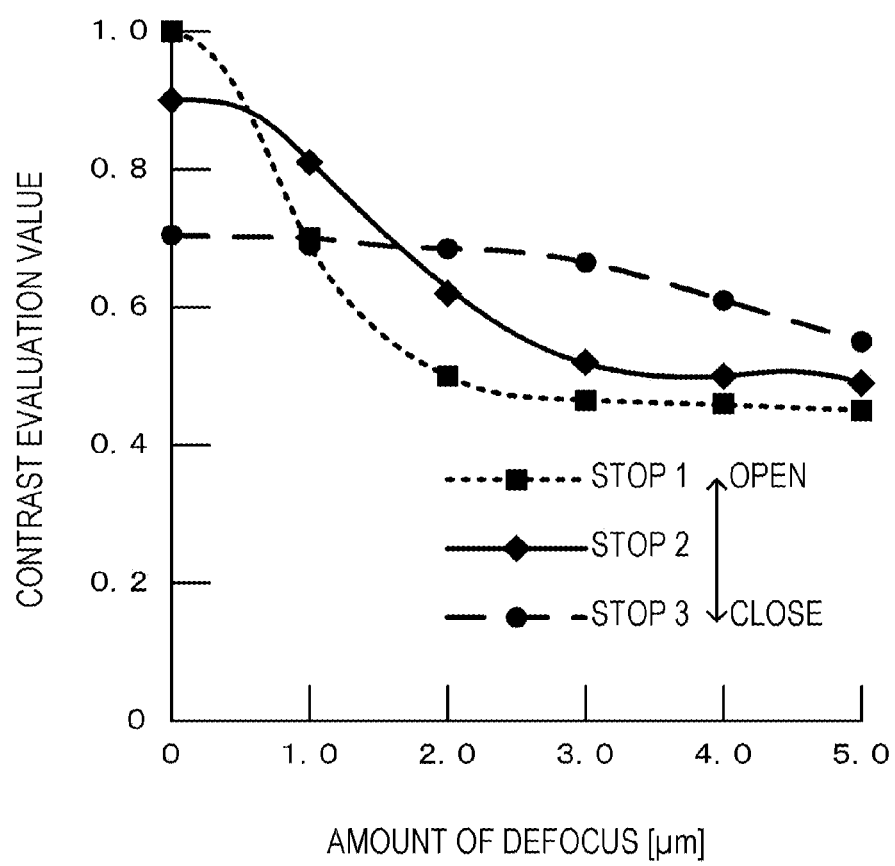

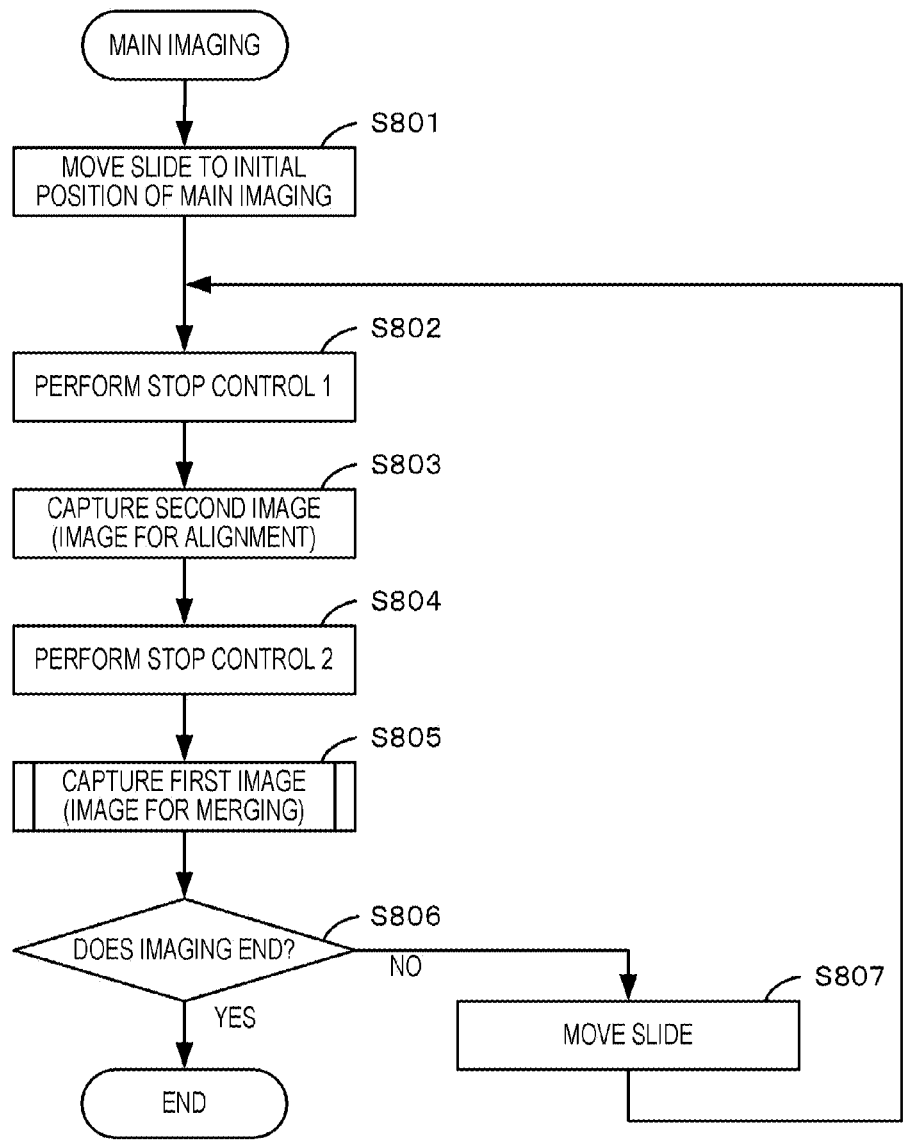

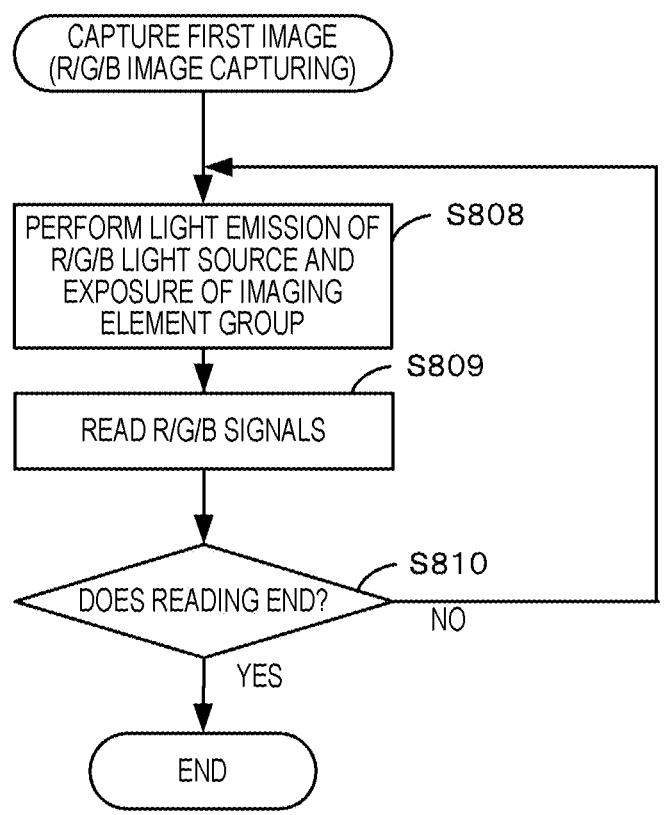

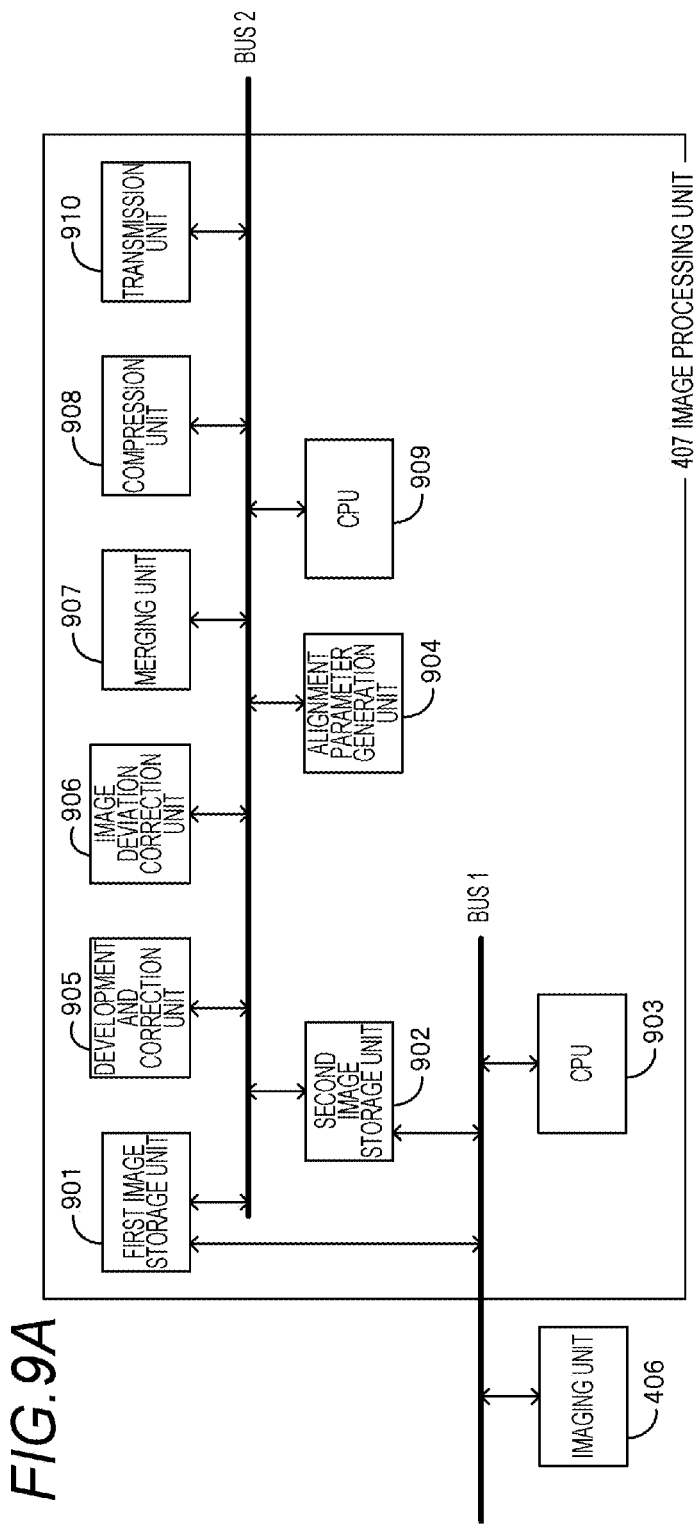
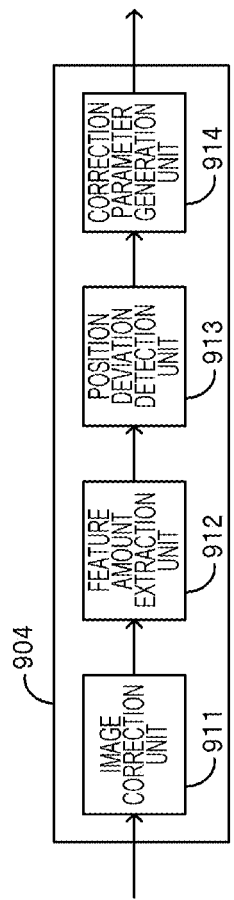
FIG. 9A
FIG. 9B

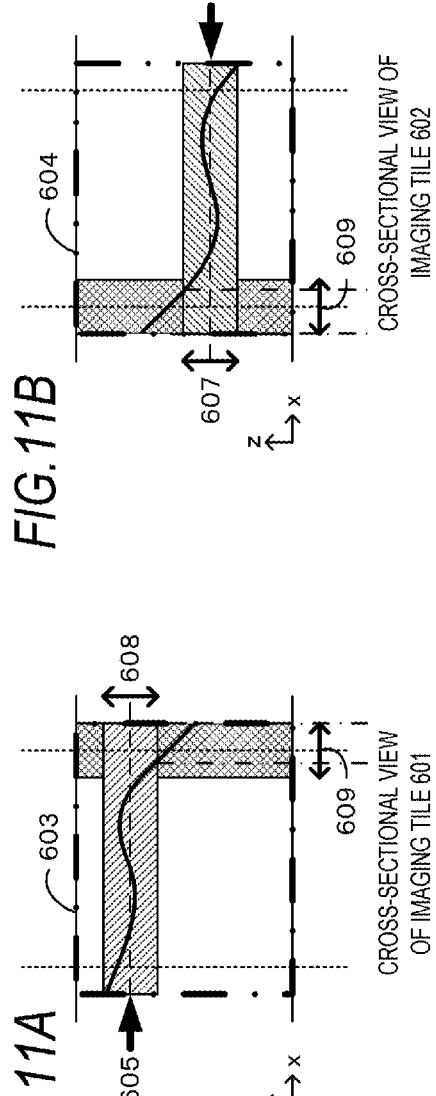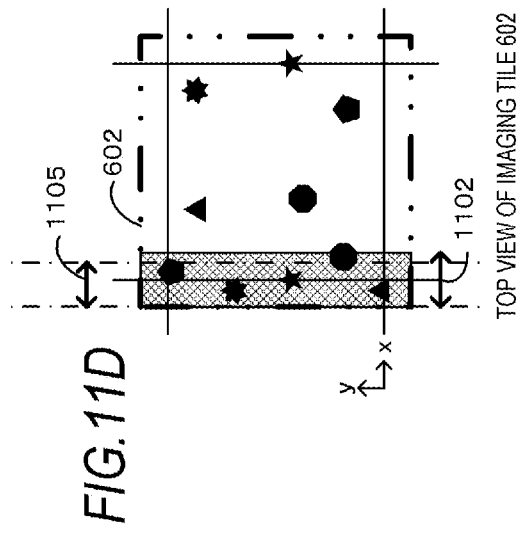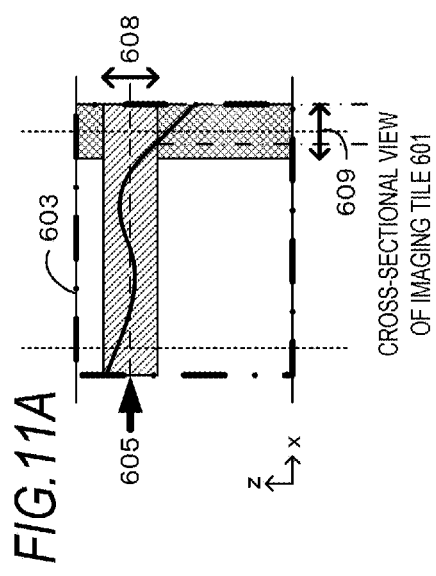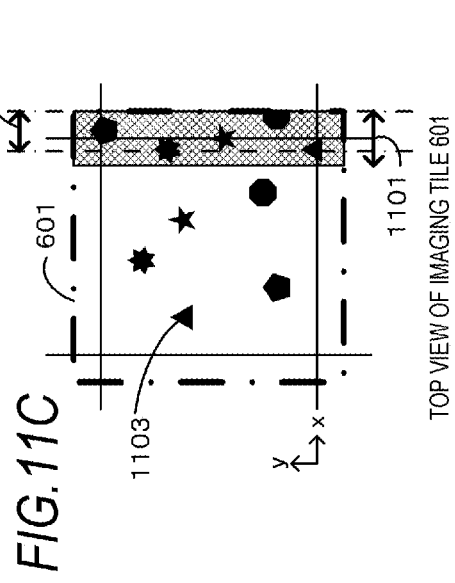

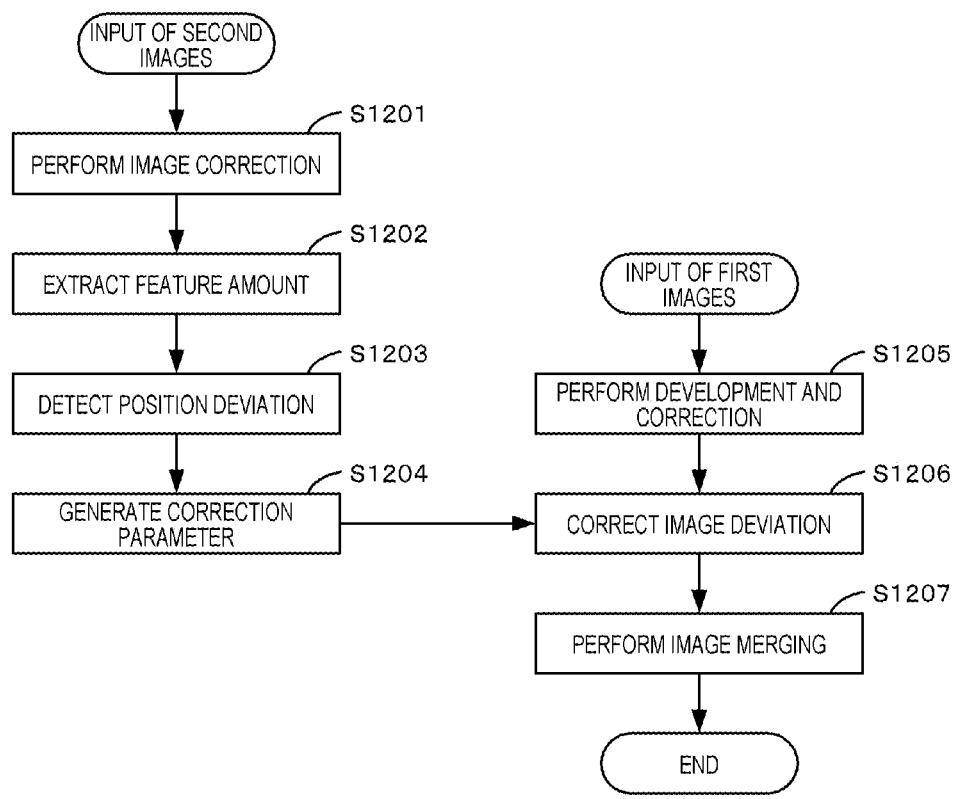

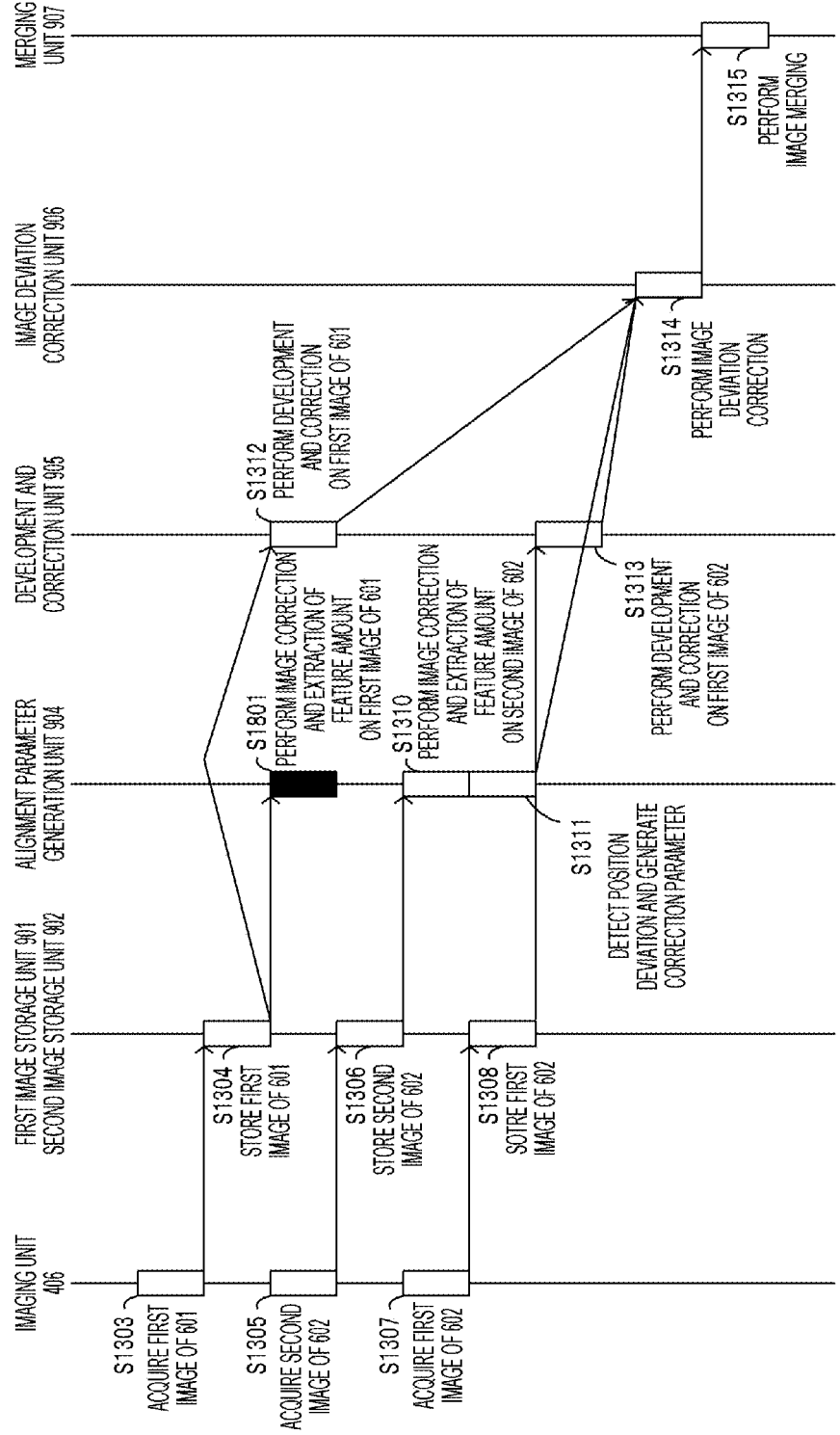

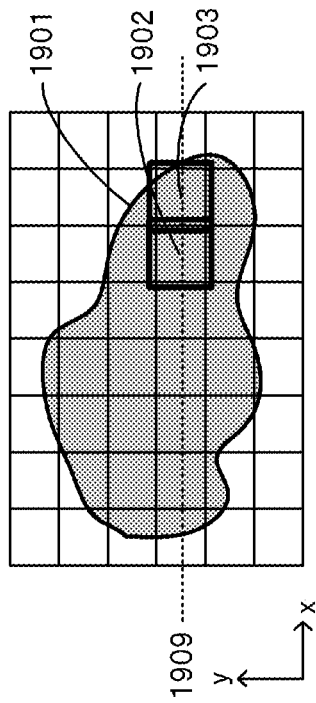
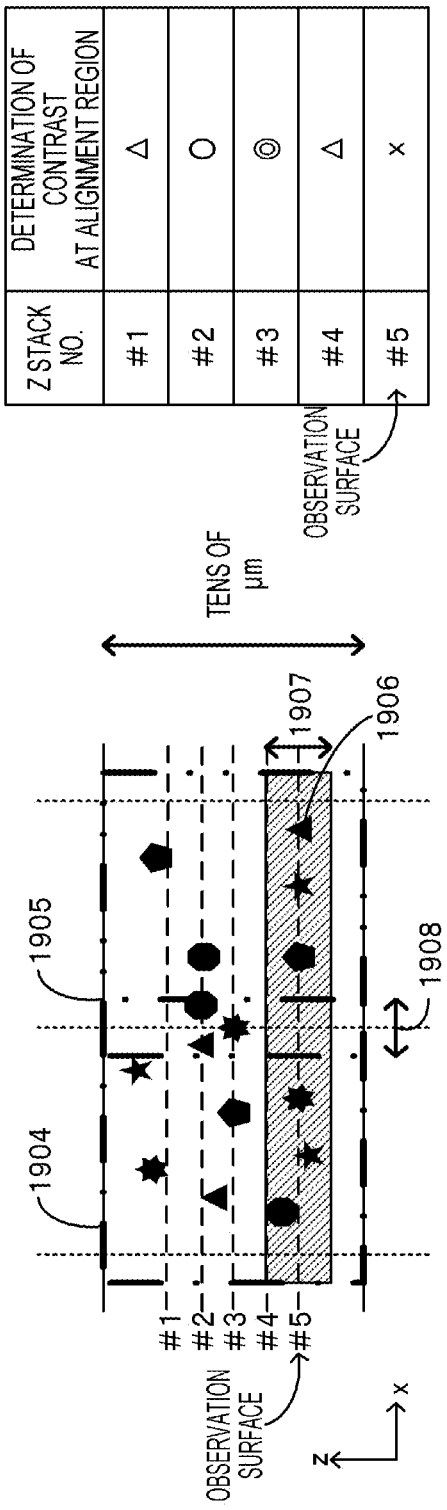

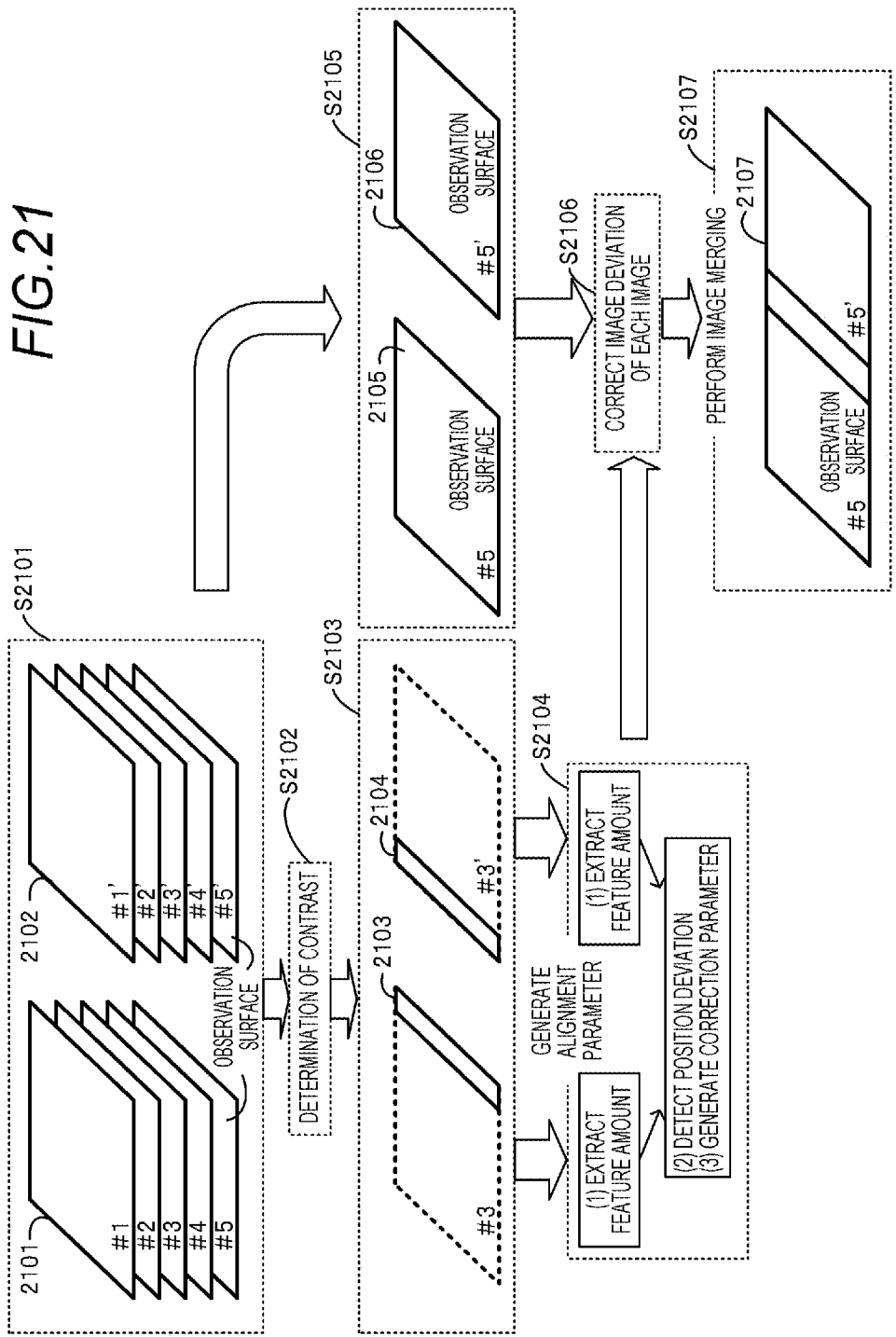

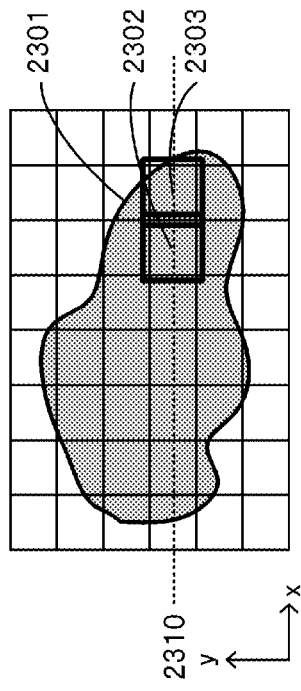
FIG. 23A
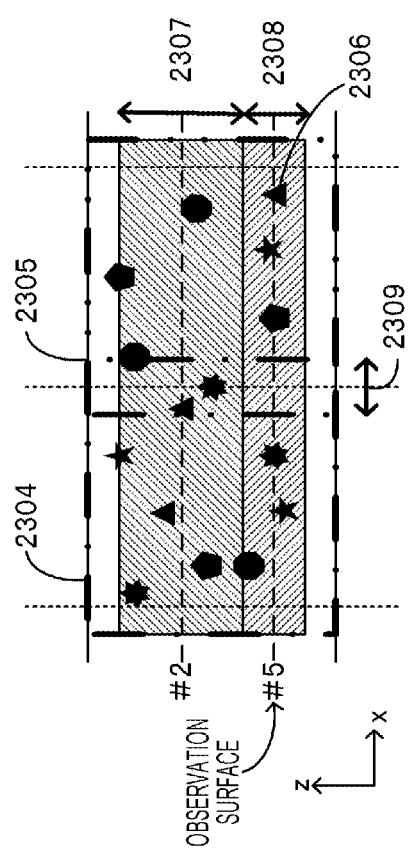
FIG. 23B
FIG. 23C

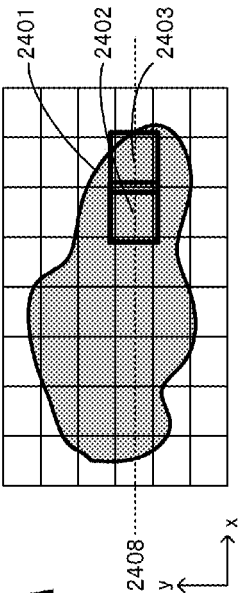
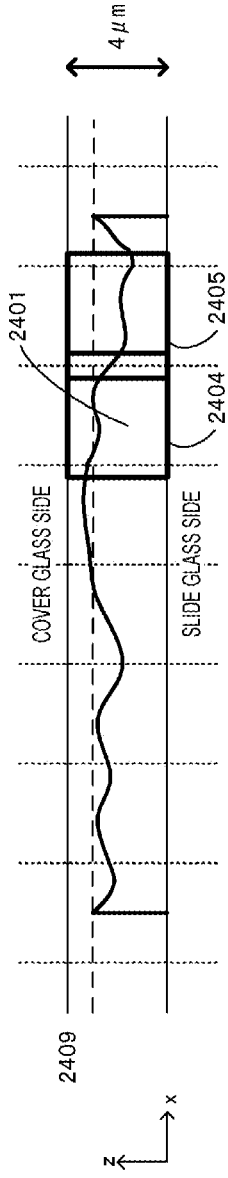
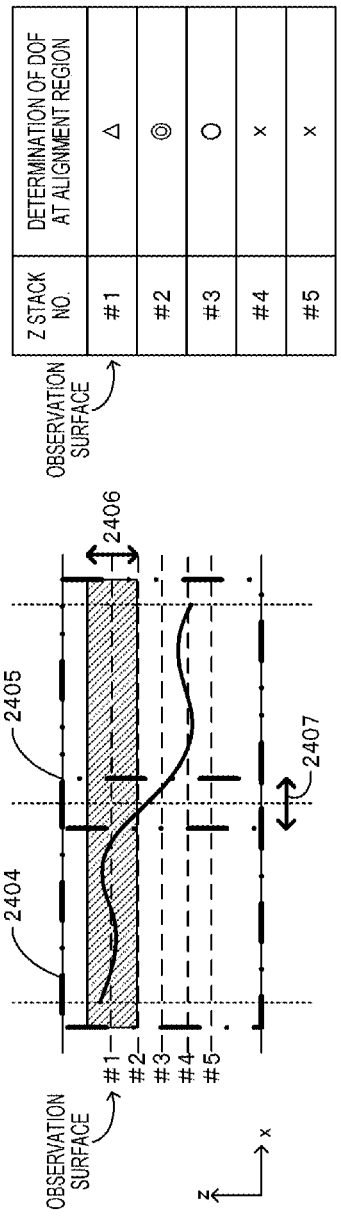
FIG.24A
FIG.24B
FIG.24C
FIG.24D

IMAGING APPARATUS AND METHOD OF CONTROLLING SAME

BACKGROUND OF THE INVENTION

1. Field of the Invention

The present invention relates to a method of controlling an image apparatus, and more particularly, to a method of controlling an imaging apparatus that images a region by dividing the region into a plurality of divided regions using an imaging device, and generates a large screen image by merging the divided regions.

2. Description of the Related Art

In a pathological field, a virtual slide apparatus that images and digitizes a sample placed on a slide so as to perform pathological diagnosis on a display is used as an alternative to an optical microscope. A conventional optical microscope image of a sample can be treated as digital data through digitization of pathological diagnosis by the virtual slide apparatus. Accordingly, it is possible to obtain the advantages of speeding up remote diagnosis, providing a description to a patient using a digital image, sharing rare cases, making education and practical training using such images more effective, and the like.

In order to realize an operation in an optical microscope using a virtual slide apparatus, the entire sample on a slide is required to be digitized. Digital data generated using the virtual slide apparatus through the digitization of the entire sample can be observed with viewer software operating in a personal computer (PC) or a workstation (WS). When the entire sample is digitized, the number of pixels is normally from hundreds of millions of pixels to billions of pixels, which is a very large amount of data. Therefore, in the virtual slide apparatus, the region of a sample is divided into a plurality of regions to be imaged using a two-dimensional imaging device that has from several hundreds of thousands of pixels to several millions of pixels, or a one-dimensional imaging device that has on the order of thousands of pixels. Since division imaging is performed, a plurality of divided images must be merged to generate an image of the entire sample.

As an alignment method when merging the divided images, there is a scheme of using feature extraction of joint portions and pattern matching by a correlation method. When image blur caused due to deviation of a sample in the depth of field or the like occurs in the joint portion (an area where a joint between two divided images is to be made), there is a problem that proper correspondence of features between the two divided images may not sufficiently be obtained, and thus alignment accuracy may deteriorate.

Japanese Patent Application Publication No. 2009-207188 discloses an imaging technology, that is, a so-called depth-of-field bracket function of adjusting a stop through a simple operation, changing the depth of field, and performing imaging. However, generation of a merged image using such images has not been disclosed.

There are known technologies for merging images, as disclosed in Japanese Patent Application Publication No. 2002-112095 and Japanese Patent Application Publication No. 2010-258885. Japanese Patent Application Publication No. 2002-112095 discloses technology that uses two exposure controls for this purpose, calculating an amount of position deviation using thinned images captured through exposure control by a second exposure control unit and generating a high dynamic range (HDR) image using the images captured through exposure control by a first exposure control unit. Japanese Patent Application Publication No. 2010-258885 discloses technology for extracting feature areas using reduced images, performing inter-image deviation amount detection between a plurality of images for which the exposure times are different and inter-image deviation correction using the feature areas, and generating an HDR image.

Japanese Patent Application Publication No. 2009-207188 discloses a technique for acquiring a focused image with improved contrast since a stop is narrowed so that the depth of field is deep and imaging is performed. However, generation of a merged image using such images has not been disclosed. The present inventors and others have studied a technique for acquiring images with improved contrast according to the method of Japanese Patent Application Publication No. 2009-207188 and performing merging based on the images. As a result, it can be understood that alignment of joint portions can be performed with good accuracy as a process of generating a merged image. However, it can be understood that there is a new problem, in that a high frequency component of the merged image is lost and resolution may deteriorate, since the stop is narrowed to perform the imaging.

According to the technologies for generating an HDR image, as disclosed in Japanese Patent Application Publication No. 2002-112095 and Japanese Patent Application Publication No. 2010-258885, an inter-image alignment process can be performed at high speed, since images are used for the inter-image alignment process separately from the HDR image. However, in such technologies, the advantage of improving alignment accuracy may not be obtained.

SUMMARY OF THE INVENTION

The invention has been devised in light of the above-described problems, and an object of the invention is to improve alignment accuracy in image merging while maintaining high resolution of an image.

The present invention in its first aspect provides a method of controlling an imaging apparatus that images an imaging target region by dividing the imaging target region into a plurality of divided regions and generates a merged image of a larger region than the divided regions by merging the obtained images in the respective divided regions. The method includes acquiring a first image and a second image in each of the divided regions, performing image alignment between adjacent divided regions using the second images, and generating the merged image by merging the first images of the adjacent divided regions based on a result of the alignment performed using the second images, where the second image is an image in which a depth of field or a focusing position, or both are different from those of the first image.

The present invention in its second aspect provides an imaging apparatus that images an imaging target region by dividing the imaging target region into a plurality of divided regions and generates a merged image of a larger region than the divided regions by merging the obtained images in the respective divided regions. The imaging apparatus includes a unit configured to acquire a first image and a second image in each of the divided regions, a unit configured to perform image alignment between adjacent divided regions using the second images, and a unit configured to generate the merged image by merging the first images of the adjacent divided regions based on a result of the alignment performed using the second images, where the second image is an image in which a depth of field or a focusing position, or both are different from those of the first image.

According to the aspects of the invention, it is possible to improve the alignment accuracy in the image merging, while maintaining the high resolution of the image.

Further features of the present invention will become apparent from the following description of exemplary embodiments with reference to the attached drawings.

BRIEF DESCRIPTION OF THE DRAWINGS

FIG. 3 is a diagram illustrating changes in an amount of defocus and contrast by the aperture stop;

FIGS. 8A and 8B are flowcharts illustrating main imaging;

FIGS. 9A and 9B are functional block diagrams relevant to the main imaging;

FIGS. 11A to 11D are schematic diagrams illustrating alignment of the imaging tile (divided images);

FIG. 12 is a flowchart illustrating merging of the imaging tile (divided images);

FIG. 18 is a diagram illustrating sequence of the merging of the divided images when the depth-of-field determination is performed;

FIGS. 19A to 19C are schematic diagrams illustrating a z stack image group and a depth of field in cytological diagnosis;

FIG. 21 is a schematic diagram illustrating a process of generating a merged image using the z stack image group;

FIGS. 23A to 23C are schematic diagrams illustrating a focusing position and a depth of field in reduction of the number of z stack images;

FIGS. 24A to 24D are schematic diagrams illustrating a z stack image group and a depth of field in histological diagnosis;

DESCRIPTION OF THE EMBODIMENTS

Figure 1:
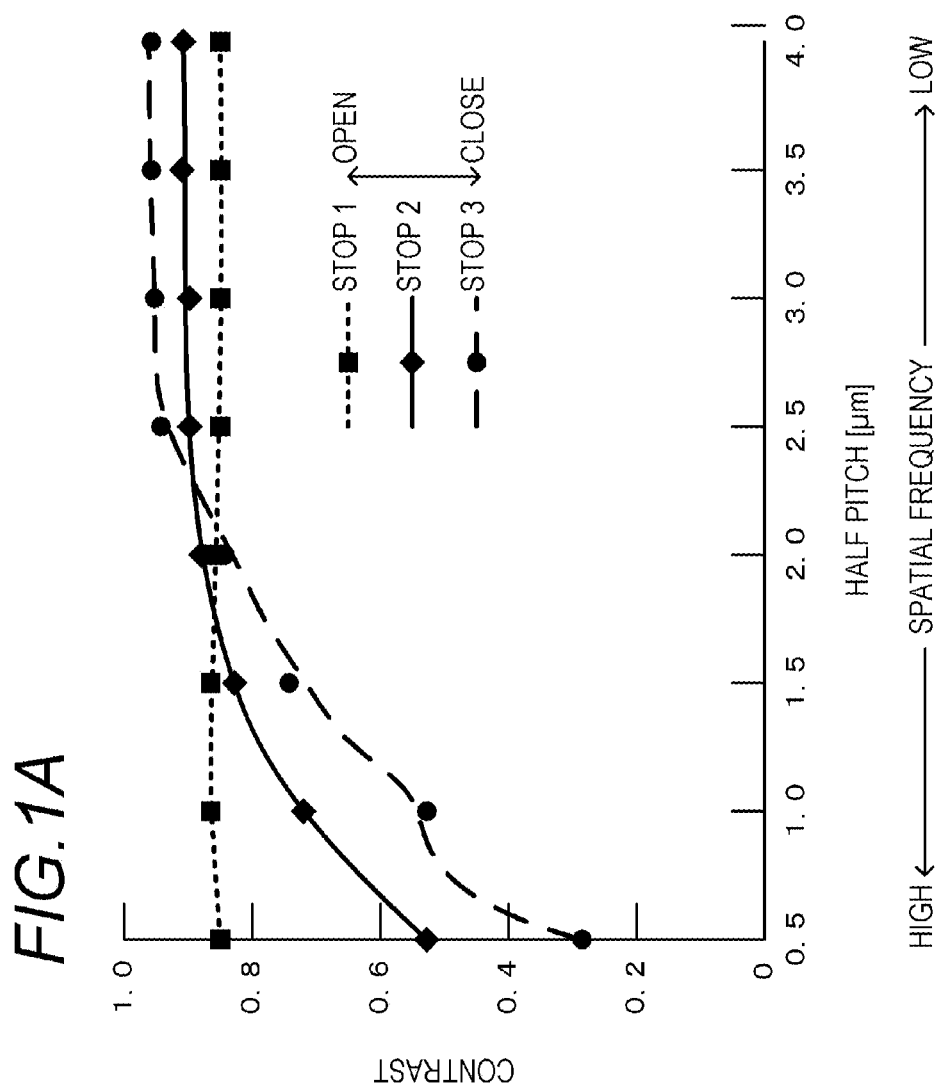
FIGS. 1A and 1B are schematic diagrams illustrating changes in a spatial frequency and contrast by an aperture stop.

First, the technical background of the invention will be described. An effect of an aperture stop in an optical image will be described with reference to FIGS. 1A, 1B, and 2. An effect of an aperture stop in a digital image will be described with reference to FIG. 3.

(Change in Contrast with Respect to Spatial Frequency by Stop)

FIG. 1A is a schematic diagram illustrating changes in spatial frequency and contrast by an aperture stop. In FIG. 1A, the horizontal axis represents a half period (half pitch [μm]) of a monochrome pattern and the vertical axis represents contrast. As illustrated in FIG. 1B, since the "half pitch" is a half period of the monochrome pattern, the half pitch is in inverse proportion to the spatial frequency. The dotted line (stop 1), the solid line (stop 2), and the dashed line (stop 3) illustrate changes in contrast with spatial frequency in order from a more open aperture stop. As the aperture stop is located closer to the open side, an image with high contrast in a region (the half pitch of 0.5 μm to 1.75 μm) where the spatial frequency is high, that is, an image with high resolution, can be obtained. When a minute structure is observed to the degree of the half pitch of about 0.5 μm in a histological diagnosis (tissue diagnosis) or a cytological diagnosis (cell diagnosis) of a pathological examination, it is known that it is better to locate the aperture stop on the open side to ensure high resolution.

As general optical characteristics, an image with high contrast in a region where the spatial frequency is high, that is, an image with high resolution, can be obtained by opening the aperture stop so that NA is high on the focusing plane.

(Change in Spatial Frequency with Respect to Depth by Stop)

Figure 2:
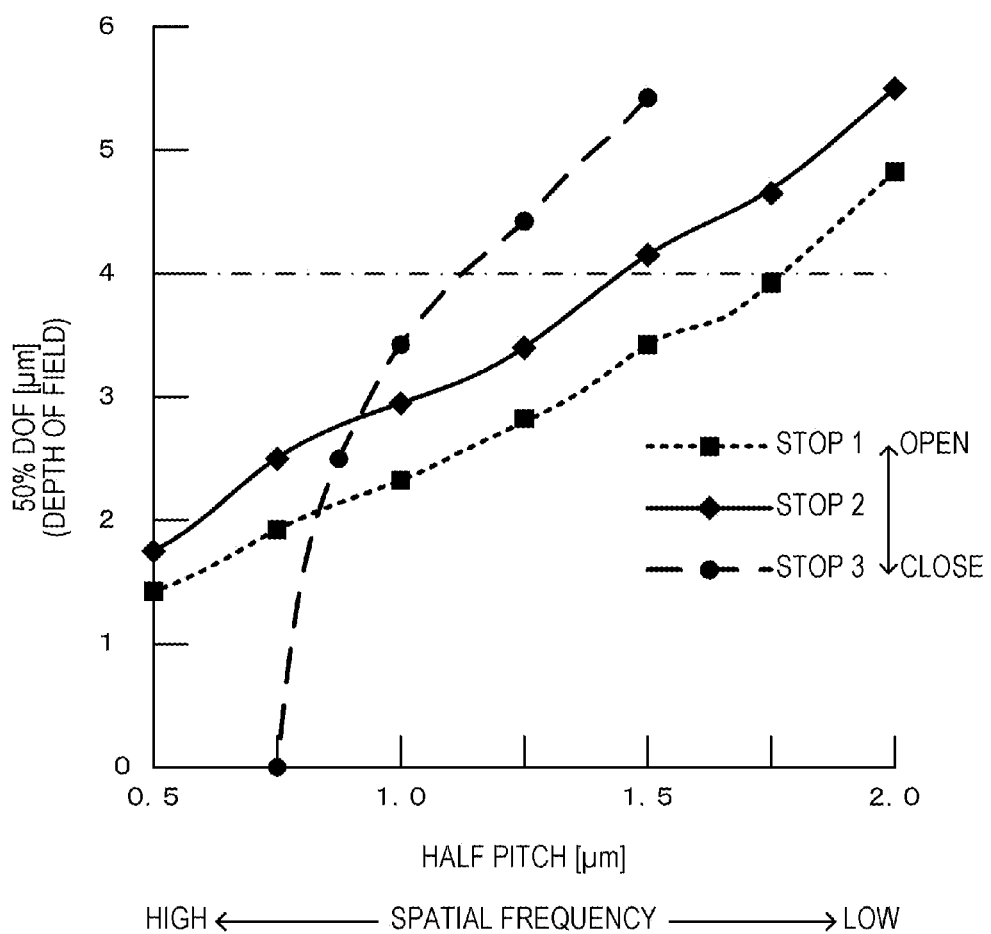
FIG. 2 is a diagram illustrating a change in a depth of field by the aperture stop.

FIG. 2 is a diagram illustrating change in depth by the aperture stop. In FIG. 2, the horizontal axis represents the half period (half pitch [μm]) of a monochrome pattern and the vertical axis represents 50% depth of field (DOF) The 50% DOF is depth from an object-side focus. The term "50%" is used, because it is the amount of deviation on the front side or the rear side from the object-side focus. The dotted line (stop 1), the solid line (stop 2), and the dashed line (stop 3) illustrate the spatial frequency obtained from 50% DOF [μm] in order from the open side of the aperture stop. In 50% DOF 4 μm, an image with higher spatial frequency can be obtained as the aperture stop is located closer to the closed side. In 50% DOF 4 μm, a structure with the half pitch of about 1.1 μm can be obtained in stop 3 on the closed side, but merely a structure with the half pitch of about 1.8 μm can be obtained in stop 1 on the open side. In a histological diagnosis or a cytological diagnosis of a pathological examination, it can be understood that the minuteness of the structure obtained in 50% DOF 4 μm is different depending on the size of the aperture stop.

As general optical characteristics, when the aperture stop is narrowed so that NA is low, an image with high resolution can be obtained at a position distant from the focusing plane.

(Change in Contrast Evaluation Value with Respect to Amount of Defocus by Aperture)

FIG. 3 is a diagram illustrating changes in an amount of defocus and a contrast evaluation value by the aperture stop. In FIG. 3, for example, the horizontal axis represents amount of defocus [μm] and the vertical axis represents contrast evaluation value. The dotted line (stop 1), the solid line (stop 2), and the dashed line (stop 3) illustrate change in the contrast evaluation value of a given image with respect to the amount of defocus [μm], in order from the more open side of the aperture stop. The amount of defocus indicates the amount of deviation from the focusing plane on the object plane. As the aperture stop is located closer to the open side, a high contrast evaluation value can be obtained in a region (an amount of defocus from 0 μm to 1.0 μm) in which the amount of defocus is small. However, as the aperture stop is located closer to the closed side, a high contrast evaluation value can be obtained in a region (an amount of defocus from 2.0 μm to 5.0 μm) in which the amount of defocus is large. When a z stack image group is acquired in a cytological diagnosis of a pathological examination, it can be understood that an image with a high contrast evaluation value can be obtained even in a region in which the amount of defocus is large as the aperture stop is narrowed.

Here, the contrast evaluation value can be calculated by the following expression, when it is assumed that E is the contrast evaluation value and L (m, n) is a brightness component of a pixel (in this expression, m is the position of a pixel in the Y direction and n is the position of a pixel in the X direction):

$$E=\Sigma(L(m,n+1)-L(m,n))^2+(L(m+1,n)-L(m,n))^2 \quad \text{[Expression 1]}$$

The first term of the right side expresses a brightness difference between pixels adjacent to each other in the X direction and the second term expresses a brightness difference between pixels adjacent to each other in the Y direction. The contrast evaluation value E is an index that indicates a sum of squares of the brightness differences between the pixels adjacent to each other in the X and Y directions. In FIG. 3, a value obtained by normalizing the contrast evaluation value E to 0 to 1 is used.

As general characteristics of an image, and particularly, a natural image or the like, an image with a high contrast evaluation value can be obtained in a region in which the amount of defocus is large, when the aperture stop is narrowed so that NA is low.

A virtual slide apparatus according to the invention is an apparatus that observes cell organelles with size of about several μm. To observe such a minute structure, as illustrated in FIG. 1A, it is better to open the aperture stop so that NA is high in order to increase the contrast of the minute structure. On the other hand, when the depth of the thickness size of a sample placed on a slide is ensured, as illustrated in FIG. 2, the resolution can be increased by narrowing the aperture stop so that NA is low. The effect of the aperture stop is reversed depending on whether the depth is taken into consideration or not. As illustrated in FIG. 3, an image with high contrast can be obtained by opening the aperture stop so that NA is high on the focusing plane in which a cell is focused. However, in consideration of a depth direction, an image in which the contrast of a cell deviated from the focusing plane is ensured can be obtained by narrowing the aperture stop so that NA is low. Thus, the effect of the aperture stop is reversed depending on the position of a cell in the depth direction.

In the invention, as described above, a necessary contrast, that is, resolution can be obtained by adjusting the aperture stop in correspondence with a required depth.

First Embodiment

First, a first embodiment of the invention will be described with reference to the drawings.

(Configuration of Imaging Apparatus)

Figure 4A:
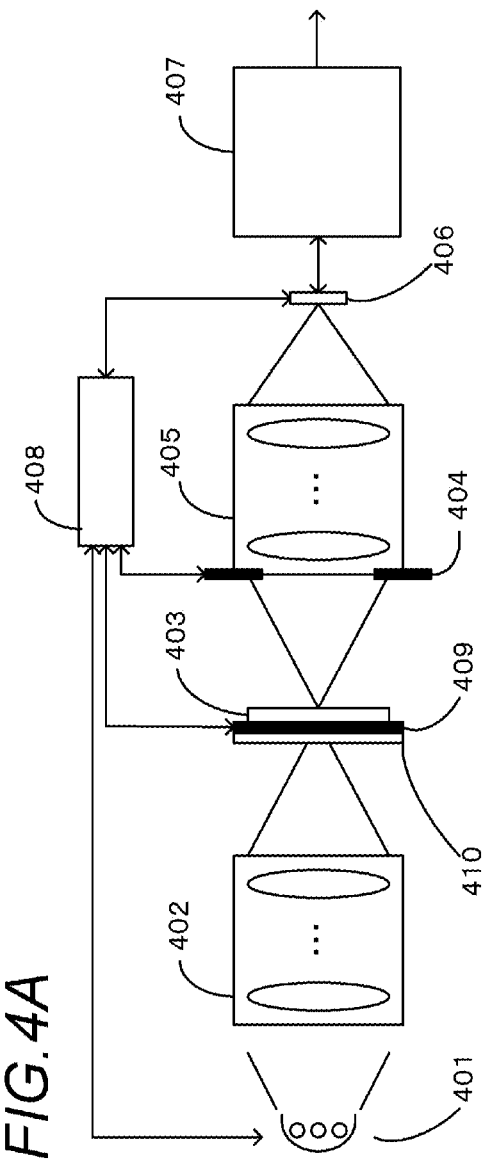
FIGS. 4A and 4B are schematic diagrams illustrating the schematic configuration of an imaging apparatus.
Figure 4B:
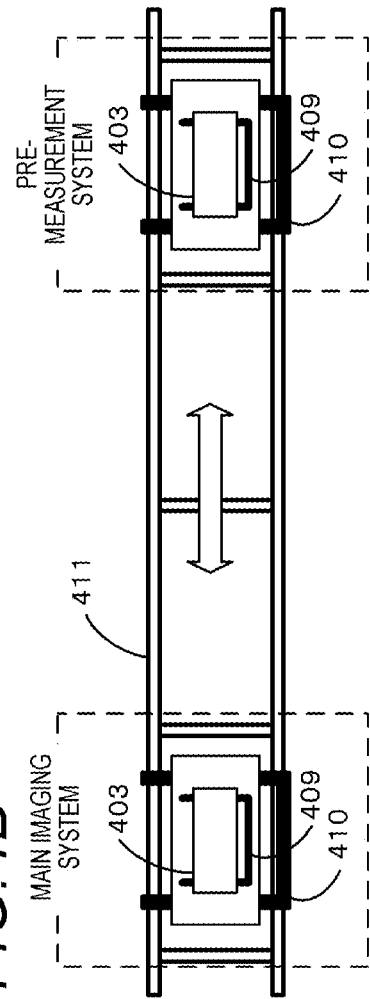

FIGS. 4A and 4B are schematic diagrams illustrating the schematic configuration of an imaging apparatus. The imaging apparatus is an apparatus that acquires an optical microscope image of a sample as a subject on a slide 403 as a digital image with high resolution and a large size (wide angle of view).

FIG. 4A is the schematic diagram illustrating the schematic configuration of the imaging apparatus. The imaging apparatus includes a light source 401, an illumination optical system 402, an aperture stop 404, an imaging optical system 405, an imaging unit 406, an image processing unit 407, an imaging control unit 408, an XYZ movement mechanism 409, and a rail movement mechanism 410. As will be described below, the image processing unit 407 includes the function blocks of an alignment parameter generation unit, a development correction unit, an image deviation correction unit, a merging unit, a compression unit, and a transmission unit. An operation or a timing of each unit of the imaging apparatus is controlled by the imaging control unit 408.

The light source 401 is a unit that generates illumination light for imaging. A light source having luminous wavelengths of three primary colors RGB is used as the light source 401. For example, the light source is configured to emit light by electrically changing each single-color light using an LED, an LD, or the like or is configured to change color mechanically to obtain each single-color light using a white LED and a color wheel. In this case, a monochrome imaging device (image sensor) having no color filter is used in an imaging device group (image sensors group) of the imaging unit 406. The light source 401 and the imaging unit 406 operate in synchronization under the control of the imaging control unit 408. Under the control of the imaging control unit 408, the light source 401 sequentially emits RGB light and the imaging unit 406 performs exposure in synchronization with a light-emission timing of the light source 401 to acquire respective images of each primary color RGB. One sheet of captured image is generated from each image of RGB by a development and correction unit of the image processing unit 407 on the rear stage.

The illumination optical system 402 is an optical system that efficiently guides light of the light source 401 to the slide 403.

The slide 403 is a supporting plate that supports a sample which is a pathological examination target and is formed by placing a sample on a slide glass and enclosing the sample with a cover glass using a mount liquid.

The aperture stop 404 controls a stop of transmission light (more specifically, diffusion light from an imaging target region) from the slide 403. An effect of the aperture stop 404 has been described with reference to FIGS. 1A to 3. The imaging target region will be described with reference to FIGS. 5A and 5B.

The imaging optical system 405 is an optical system that enlarges and guides transmission light from the slide 403 and forms a real image of the slide 403 (more specifically, a real image of the imaging target region) on an image plane of the imaging unit 406.

The XYZ movement mechanism 409 includes an XY plane movement mechanism that performs control such that the sample is located in the vicinity of the middle of an imaging screen and a Z direction movement mechanism that controls the position of the sample in the z direction. A plane perpendicular to the optical axis is referred to as an xy plane and the optical-axis direction is referred to as the z direction. The xy plane position of the sample on the slide 403 is comprehended through pre-measurement to be described with reference to FIG. 4B. The position of the sample on the slide 403 in the z direction is determined using an auto-focus function of the imaging unit 406. The auto-focus function of the imaging unit 406 can be realized by means of contrast AF or phase difference AF, used widely in practice. The imaging control unit 408 controls the xyz positions of the slide 403 based on information regarding the pre-measurement and the auto-focus function.

The rail movement mechanism 410 is a mechanism that moves the slide 403 between a main imaging system and pre-measurement system, and is illustrated in detail in FIG. 4B. The slide 403 is supported on the XYZ movement mechanism 409, and the slide 403 and the XYZ movement mechanism 409 are supported on the rail movement mechanism 410. In such a configuration, the slide 403 can be moved between the pre-measurement system and the main imaging system through a rail 411. The main imaging system is an imaging mechanism illustrated in FIG. 4A and the pre-measurement system is a measurement mechanism that comprehends the sample position of the slide 403. In the imaging apparatus according to this embodiment, the pre-measurement system first comprehends the sample position of the slide 403, then the sample is moved to the main imaging system, and imaging of a high-resolution and a large size of the sample is performed.

The imaging unit 406 is an imaging unit that includes a two-dimensional imaging device. As the two-dimensional imaging device, a CMOS image sensor or a CCD image sensor is used. The imaging unit 406 includes the two-dimensional imaging device, a correlated double sampling circuit (CDS circuit), an auto-gain control circuit (AGC circuit), an analog-to-digital conversion circuit (AD conversion circuit), and an auto-focus function. A digital signal of a captured image is transmitted from the imaging unit 406 to the image processing unit 407.

The image processing unit 407 includes functional blocks of a development correction unit, an alignment parameter generation unit, an image deviation correction unit, a merging unit, and a compression unit. The development correction unit performs a development process and a correction process on the digital signal of the captured image acquired by the imaging unit 406. Examples of the functions include black-level correction, digital noise reduction (DNR), pixel flaw correction, brightness correction for individual variation of an imaging device or shading, a development process, a white balance process, an enhancement process, distortion aberration correction, and magnification chromatic aberration correction. The alignment parameter generation unit generates a correction parameter used to join a plurality of captured images (divided images). The divided images for generation of an alignment parameter are subjected to image correction such as distortion aberration correction, and then the corrected images are each subjected to processes of extracting a feature amount, detecting position deviation, and generating a correction parameter. The image deviation correction unit performs position deviation correction on the plurality of captured images (divided images) using the correction parameter generated by the alignment parameter generation unit. The merging unit joins the captured images (divided images) obtained after the image deviation correction. The images to be joined are images that have been subjected to the distortion aberration correction or magnification aberration correction by the development correction unit. The compression unit performs a compression process sequentially for each block image output from the merging unit. The transmission unit outputs the signals of compressed block images to a personal computer (PC) or a workstation (WS). A communication scheme such as a gigabit Ethernet by which a large amount of data can be transmitted is used for the transmission of the signal to the PC or the WS. The transmitted compressed block images are sequentially stored in storage of the PC or the WS. The acquired captured images of the sample may be browsed using viewer software. The viewer software reads and decompresses the compressed block images of browse regions, and displays the block images on a display.

With the above-described configuration, it is possible to acquire a digital image of the sample with high resolution or large size (a wide angle of view), and display the acquired image.

Here, the configuration has been described in which single-color light of different colors is emitted sequentially from the light source 401 and the imaging is performed by a monochromic two-dimensional imaging device. However, a white LED may be used as the light source and an imaging device having color filters attached may be used as the imaging device.

(Imaging Target Region and Imaging Tile)

Figure 5A:
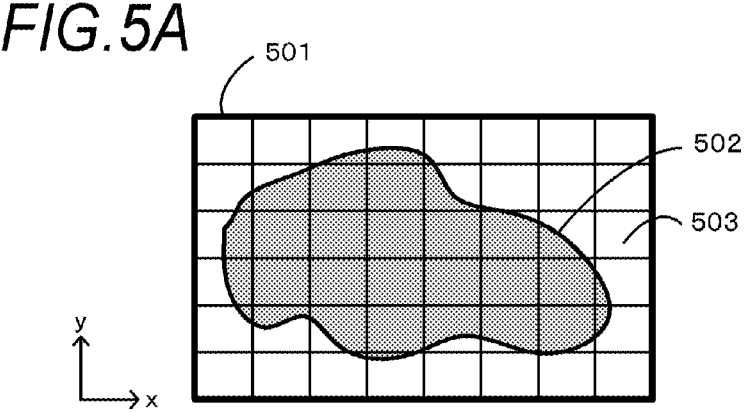
FIGS. 5A and 5B are schematic diagrams illustrating an imaging tile by a two-dimensional imaging device.
Figure 5B:
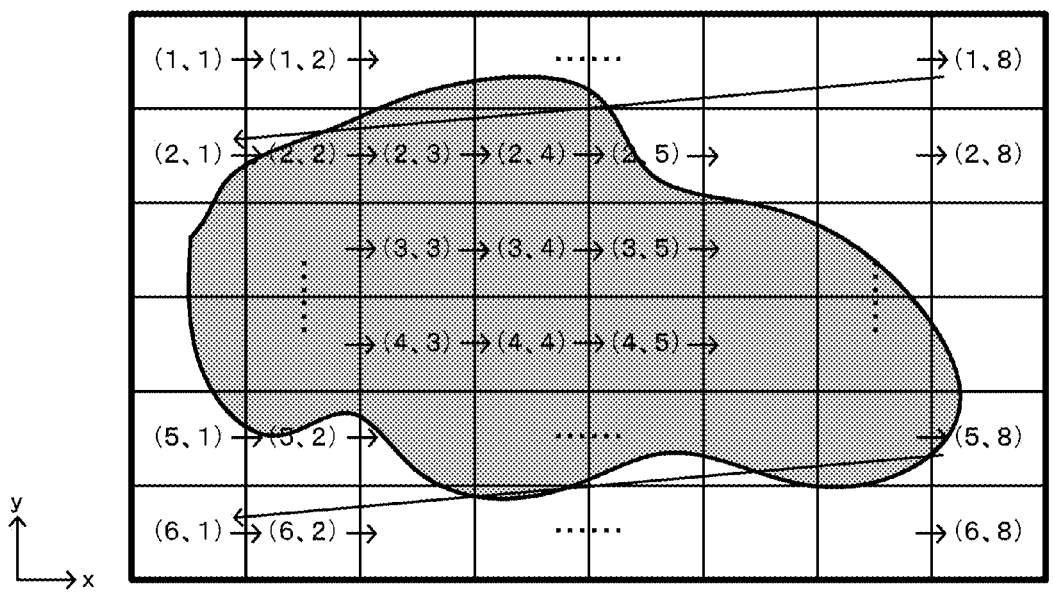

FIGS. 5A and 5B are schematic diagrams illustrating an imaging tile by the two-dimensional imaging device. The imaging apparatus according to this embodiment is an apparatus that acquires an optical microscope image of the sample on the slide 403 as a digital image with high resolution and a large size (wide angle of view). To make high resolution and a large size (wide angle of view) compatible, an imaging target region is divided into several regions and the divided regions are imaged by the two-dimensional imaging device. Here, an imaging region to be imaged as the image of the entire sample is referred to as the "imaging target region" and the divided regions are referred to as "imaging tiles." The imaging target region is formed by merging the imaging tiles. Further, a plane perpendicular to an optical axis is referred to as an xy plane.

FIG. 5A is the schematic diagram illustrating the imaging target region and the sample on an object plane. The imaging target region 501 is divided into eight regions in the x direction and six regions in the y direction. 503 denotes an imaging tile as one of these regions. The imaging target region 501 is a region set on the slide 403 by coordinates and is set for each slide 403 in consideration of the position of a sample 502 on the slide 403. In the pre-measurement, the coordinates of the imaging target region 501 on the slide 403 are set such that the sample 502 is located in the vicinity of the center of the imaging target region 501.

FIG. 5B is the schematic diagram illustrating the imaging tiles 503 on the object plane. An imaging tile (N, M) represents an imaging tile located at an Nth in the y direction and at an Mth in the x direction. As an imaging example of the plurality of divided regions (imaging tiles), arrows indicate an imaging order in which the imaging tile (1, 1) to the imaging tile (1, 8) are first imaged in the x direction, the imaging tiles are moved in the y direction, and the imaging tile (2, 1) to the imaging tile (2, 8) are subsequently imaged. In consideration of the merging of the imaging tiles, an "interest imaging tile" (one that contains the image that is of interest, or of particular interest) and all of the imaging tiles in the vicinity of the interest imaging tile are subjected to an image merging process. When the imaging tile (3, 4) is an interest imaging tile, the imaging tile (3, 4) and eight imaging tiles, the imaging tiles (2, 3), (2, 4), (2, 5), (3, 3), (3, 5), (4, 3), (4, 4), and (4, 5)

are subjected to the image merging process. In the merging process, the adjacent imaging tiles have mutually overlapping regions, and the overlapping regions are used as alignment regions. However, in FIGS. 5A and 5B, the alignment regions are not illustrated.

Here, the case has been described in which all of the imaging tiles of the imaging target region 501 are imaged. However, imaging tiles such as the imaging tile (1, 1) in which the sample 502 is not present may if desired not be imaged, but be skipped. Thus, it is possible to obtain the advantages of shortening the imaging time due to reduction in the number of times imaging is performed and reducing the memory capacity required due to a reduction in the number of captured images.

As described above, the imaging apparatus divides the imaging target region into several imaging tiles (divided regions), sequentially images the imaging tiles, and performs the merging process of merging the interest imaging tile with all of the imaging tiles in the vicinity of the interest imaging tile.

(Focal Position and Depth of Field)

Figure 6A:
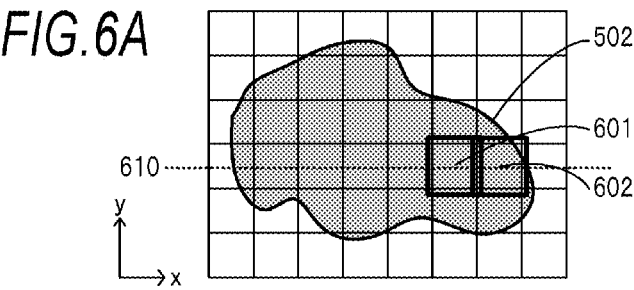
FIGS. 6A to 6C are schematic diagrams illustrating a focusing position and a depth of field in a sample.
Figure 6B:
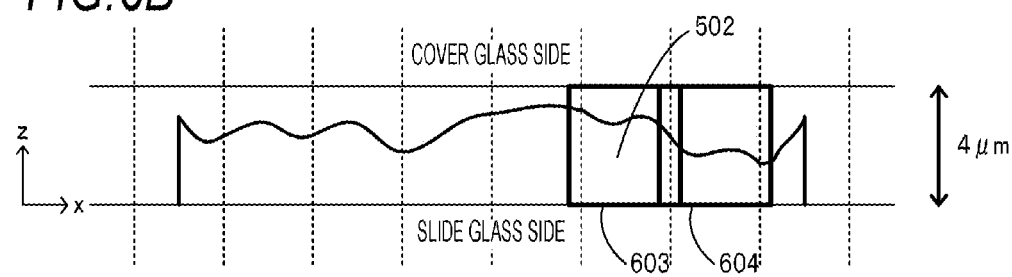
Figure 6C:
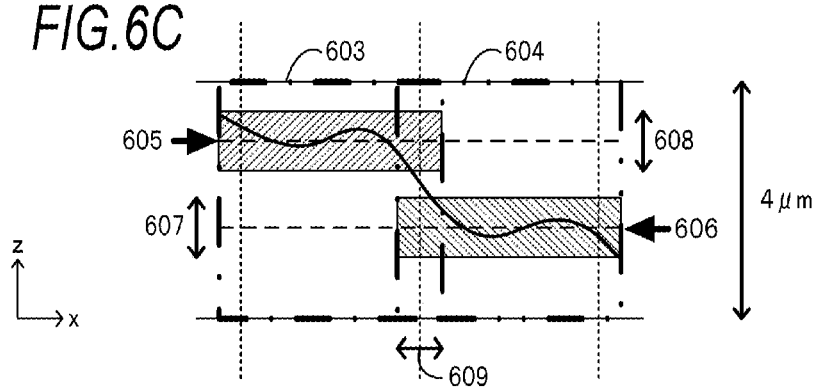

FIGS. 6A to 6C are schematic diagrams illustrating a focusing position and a depth of field in the sample.

FIG. 6A is an upper view schematically illustrating the sample of the histological diagnosis on the object plane. When a process of merging an imaging tile (4, 6) 601 with an imaging tile (4, 7) 602 is focused on, the imaging tiles including overlapping regions are indicated by thick frames in these FIGS.

FIG. 6B is a cross-sectional view schematically illustrating the sample of the histological diagnosis. The xz plane of the sample 502 that is seen is the plane at a cut surface 610 illustrated in FIG. 6A. The sample 502 is present, pinched between a slide glass and a cover glass, and the surface corrugation of the sample 502 is illustrated by the curved line in FIG. 6B. An xz plane 603 of the imaging tile (4, 6) 601 and an xz plane 604 of the imaging tile (4, 7) 602 are illustrated. The gap between the slide glass and the cover glass is 4 µm.

FIG. 6C is an expanded view schematically illustrating the cross-section of the sample for the histological diagnosis, the xz planes 603 and 604 illustrated in FIG. 6B are illustrated. First, a focusing position and a depth of field will be described by reference to the region of the xz plane at reference number 603. The focusing position 605 of the xz plane region 603 is indicated by the dashed line. The focusing position 605 is a surface obtained by performing straight-line approximation on the surface of the sample 502 by the least-squares method or the like and is a position determined by an auto-focus function of the imaging unit 406. The actual focusing position 605 is not determined by the surface corrugation of the sample 502 of the xz plane region 603, which is one cross-sectional surface, but is determined by the surface corrugation of the sample 502 in the imaging tile (4, 6), at reference number 601. Nonetheless, hereinafter, to facilitate explanation, the description will be made on the assumption that the focusing position is determined by the surface corrugation of one cross-sectional surface. The depth of field 608 of a first image of the xz plane region 603 is a range indicated by a diagonal line (left downward diagonal line), and is a range determined by the aperture stop 404. Here, the depth of field of the first image is ±0.5 µm. The first image is an image provided to the image merging process, and is an image that will be part of the merged image that results from the merging process. The first image will be described in detail below. Likewise, when the region of the xz plane 604 is focused on, a focusing position 606 is indicated by a dashed line and a depth of field 607 of the first image is indicated by a diagonal line (right downward diagonal line). An alignment region (xz plane) 609 is an overlapping region of the imaging tile (4, 6) 601 and the imaging tile (4, 7) 602 and is a region used as an alignment region in the merging process. An image of the xy plane is used for alignment in the image merging. Here, however, the illustrated view of alignment region (xz plane) 609 is a cross-sectional view showing the xz plane 610, which is one particular cross-sectional plane, as described above. Hereinafter, a relation between the depth of field 608 of the first image of the xz plane 603 and the depth of field 607 of the first image of the xz plane 604 in the alignment region (xz plane) 609 will be described. In each imaging tile, the focusing position is determined by the surface corrugation of the sample 502. Therefore, as illustrated in FIG. 6C, the depths of field of the first image between the adjacent imaging tiles do not overlap each other in some cases. There is a possibility that such a situation may occur when a portion in which the inclination of the surface corrugation is large is near the alignment region between the imaging tiles or when the z movement accuracy of the XYZ movement mechanism 409 is not high. FIG. 6C illustrates a case in which one cross-sectional surface of the xz plane is considered. However, even when the xy plane is considered, there is a possibility that a situation may occur in which the depths of field of the first image do not overlap each other in a surface corrugation upraised like a mountain in the imaging tile (4, 6) 601 and depressed like a valley in the imaging tile (4, 7) 602. In this case, image blur may occur in the alignment region of the imaging tile (4, 6) 601 and the imaging tile (4, 7) 602. The occurrence of the image blur (blur state) depends on the focusing position in each imaging tile, the depth of field, and the surface corrugation of the sample 502.

As described above, due to the focusing position in each imaging tile, the depth of field, and the surface corrugation of the sample, the image blur may occur in the alignment region for performing the merging process in some cases. Due to the image blur in the alignment region, the accuracy of extraction (which will be described below) of a feature amount in the alignment may deteriorate considerably, and thus an image merging process may not be performed with high accuracy. When the accuracy of the extraction of the feature amount deteriorates in one of the imaging tiles provided in the merging process, the accuracy of the image merging process may deteriorate.

(Pre-Measurement Process)

Figure 7:
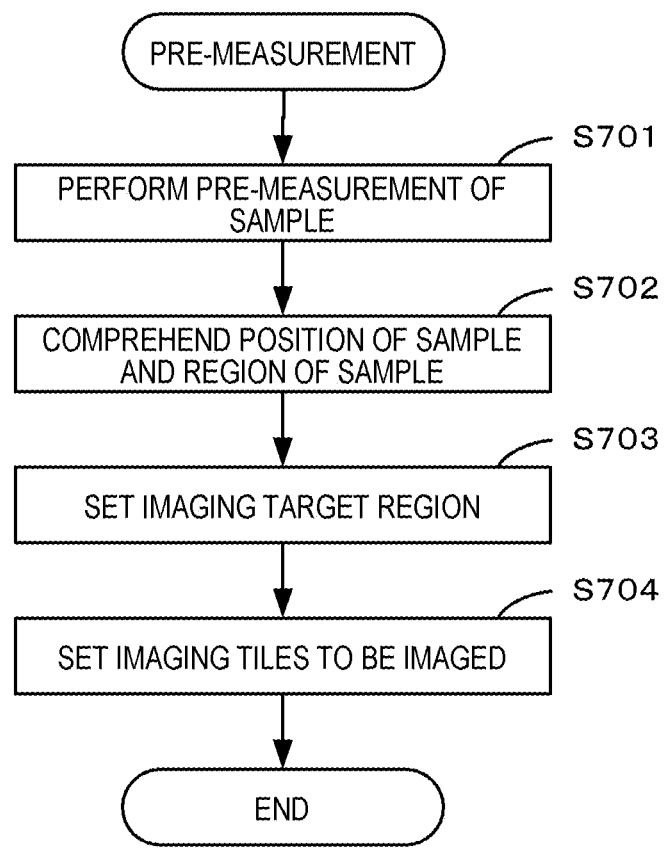
FIG. 7 is a flowchart illustrating pre-measurement.

FIG. 7 is a flowchart illustrating pre-measurement. The processing of the steps to be described below is performed by the pre-measurement system illustrated in FIG. 4B.

In step S701, pre-imaging is performed on the sample 502. The pre-imaging is performed to capture the entire image of the slide 403 and is performed with an industrial digital camera or the like.

In step S702, the region of the sample 502 and the position of the sample 502 on the slide 403 are comprehended. The region of the sample 502 is extracted using the image obtained through the pre-imaging, and which region the extracted region is located at on the slide 403 is stored as coordinate information.

In step S703, an imaging target region in the main imaging system is set. Referring to FIGS. 5A and 5B, the coordinates of the imaging target region 501 on the slide 403 are set so as to be suitable for the position at which the sample 502 is present on the slide 403. The coordinates of the imaging target region 501 on the slide 403 are set so that the sample 502 is located in the vicinity of the center of the imaging target region 501.

In step S704, the imaging tiles to be imaged are set. Referring to FIG. 5B, it is determined whether the imaging of the imaging tiles, such as the imaging tile (1, 1) and the like, in which the sample 502 is not present in the imaging target region 501 is to be performed. Those imaging tiles for which it is not necessary to perform the imaging are not imaged, and the imaging tiles that are to be imaged are selected. Whether the imaging is performed can be specified by a user or can be automatically determined based on the region extraction result of the sample 502.

As described above, in the pre-measurement process, the coordinates of the imaging target region 501 on the slide 403 are set and the imaging tiles to be imaged are set.

(Main Imaging Process)

FIGS. 8A and 8B are flowcharts illustrating the main imaging process. Processing of the steps to be described below is performed by the main imaging system illustrated in FIG. 4B.

FIG. 8A illustrates a processing flow when the imaging tiles are imaged a plurality of times and the imaging target region 501 is acquired. The imaging of the imaging tiles includes imaging of a second image, which is an image for use in the alignment processing, and imaging of a first image, which is an image to be merged with others to produce the desired merged image. The processes of the steps to be described below are performed by the imaging control unit 408 or are performed by respective units of the imaging apparatus based on an instruction from the imaging control unit 408.

In step S801, the slide is moved at the initial position (where N=1; N is a serial number of the imaging tiles to be imaged) of the main imaging. The slide 403 is moved from the pre-measurement system to the main imaging system, and then the slide 403 is set so that the imaging tile to be first imaged is imaged based on the coordinate information of the imaging target region 501 on the slide 403 acquired in the pre-measurement. Further, the position of the slide 403 in the z direction is set by the auto-focus function of the imaging unit 406. Here, the focusing position of the imaging tile is determined. When it is determined in step S704 of FIG. 7 that the imaging tiles in which the sample 502 is not present are not imaged, the imaging tile (1, 3) is determined as the imaging tile to be first imaged and this imaging tile is set at the initial position of the main imaging system.

In step S802, stop control 1 is performed. The aperture stop 404 is controlled and is set as the stop used to image the second image for the alignment. The second image is an image that has a deep depth of field and high contrast in a region in which the defocus amount is large, and can be obtained by narrowing the aperture stop 404 so that the NA is low, as described in FIGS. 2 and 3.

In step S803, the second image of an Nth imaging tile is captured. The second image is an image used for the alignment and is acquired separately from the image (the first image) used for the merging.

In step S804, stop control 2 is performed. The aperture stop 404 is controlled and is set as the stop used to capture the first image, for the merging. The first image is an image (an image with high resolution) from which a modulation transfer function (MTF) can be obtained in a region with a high spatial frequency, and can be obtained by opening the aperture stop 404 and setting a high NA, as described in FIGS. 1A and 1B.

In step S805, the first image of the Nth imaging tile is captured. The first image is an image used for the merging and is acquired separately from the image (the second image) used for the alignment.

In step S806, it is determined whether the imaging of all of the imaging tiles of the imaging target region 501 ends. When the imaging of all of the imaging tiles of the imaging target region 501 does not end, the process proceeds to step S807. When the imaging of all of the imaging tiles ends, the process ends.

In step S807, the slide 403 is moved to a position at which the subsequent imaging tile can be imaged by the XYZ movement mechanism 409.

FIG. 8B illustrates a processing flow fragmented from the process of capturing the first image in step S805 of FIG. 8A.

In step S808, light emission of a single-color light source (an R light source, a G light source, or a B light source) and exposure of the two-dimensional imaging device start. The turn-on and turn-off timings of the single-color light source and an exposure timing of the two-dimensional imaging device are controlled, and in particular, the turn-on and turn-off timings of the single-color light source and the exposure timing of the two-dimensional imaging device are synchronized.

In step S809, a single-color image signal (an R image signal, a G image signal, or a B image signal) from the two-dimensional imaging device is read.

In step S810, it is determined whether the imaging of the RGB images all ends. When the imaging of the RGB images does not end, the process returns to step S808 and the imaging of a subsequent color is performed. When the imaging of all of the colors ends, the process ends.

In the processing steps described above, the second image which is the image for the alignment and the first image which is the image for the merging are continuously captured in each imaging tile.

(Imaging Function)

FIGS. 9A and 9B are functional block diagrams relevant to the main imaging. FIG. 9A illustrates the functional block diagram of the imaging unit 406 and the image processing unit 407. The image processing unit 407 includes a first image storage unit 901, a second image storage unit 902, a CPU 903, an alignment parameter generation unit 904, a development and correction unit 905, an image deviation correction unit 906, a merging unit 907, a compression unit 908, a CPU 909, and a transmission unit 910. FIG. 9B illustrates the functional block diagram of the alignment parameter generation unit 904. The alignment parameter generation unit 904 includes an image correction unit 911, a feature amount extraction unit 912, a position deviation detection unit 913, and a correction parameter generation unit 914.

The first image storage unit 901 is a memory that stores the first image. Writing on the first image storage unit 901 is controlled by the CPU 903 and reading is controlled by the CPU 909.

The second image storage unit 902 is a memory that stores the second image. As in the first image storage unit 901, writing on the second image storage unit 902 is controlled by the CPU 903 and reading is controlled by the CPU 909.

The CPU 903 is a CPU that controls timings at which the first and second images acquired by the imaging unit 406 are stored in the first image storage unit 901 and the second image storage unit 902, respectively.

The alignment parameter generation unit 904 generates a correction parameter used to join the imaging tiles (divided images) for the second image stored in the second image storage unit 902. First, the image correction unit 911 performs image correction such as distortion aberration correction on each imaging tile image for generation of an alignment parameter. Next, the feature amount extraction unit 912 extracts a feature amount at the alignment region of each of the corrected images. Next, the position deviation detection unit 913 detects relative position deviation between the images based on the feature amount. Then, the correction parameter generation unit 914 generates a position deviation correction amount (correction parameter) of each image from the relative position deviation amount.

The development and correction unit 905 performs a development process and a correction process on the first image stored in the first image storage unit 901. Examples of the functions include black-level correction, digital noise reduction (DNR), pixel flaw correction, brightness correction for individual variation of an imaging device or shading, a development process, a white balance process, an enhancement process, distortion aberration correction, and magnification chromatic aberration correction.

The image deviation correction unit 906 performs position deviation correction on the first image of each imaging tile using the correction parameter generated by the alignment parameter generation unit 904.

The merging unit 907 performs a process of joining the imaging tiles (divided images) that have been subjected to the image deviation correction. The images to be joined have been subjected to the distortion aberration correction and the magnification aberration correction by the development and correction unit 905.

The compression unit 908 performs a compression process on each block image output from the merging unit 907 in order.

The CPU 909 is a CPU that controls a timing at which the first image stored in the first image storage unit 901 is read out to the development and correction unit 905 and a timing at which the second image stored in the second image storage unit 902 is read out to the alignment parameter generation unit 904.

The transmission unit 910 outputs a signal of a compression block image to a PC or a WS. A communication scheme such as a gigabit Ethernet by which a large amount of data can be transmitted is used for the transmission of the signal to the PC or the WS.

With the functional blocks described above, the correction parameter used to correct image deviation can be generated using the second image even in an image in which the alignment region of the first image is blurred. Therefore, it is possible to realize image deviation correction of the first image and the image merging process using the correction parameter.

(Concept of Image Merging Process)

Figure 10:
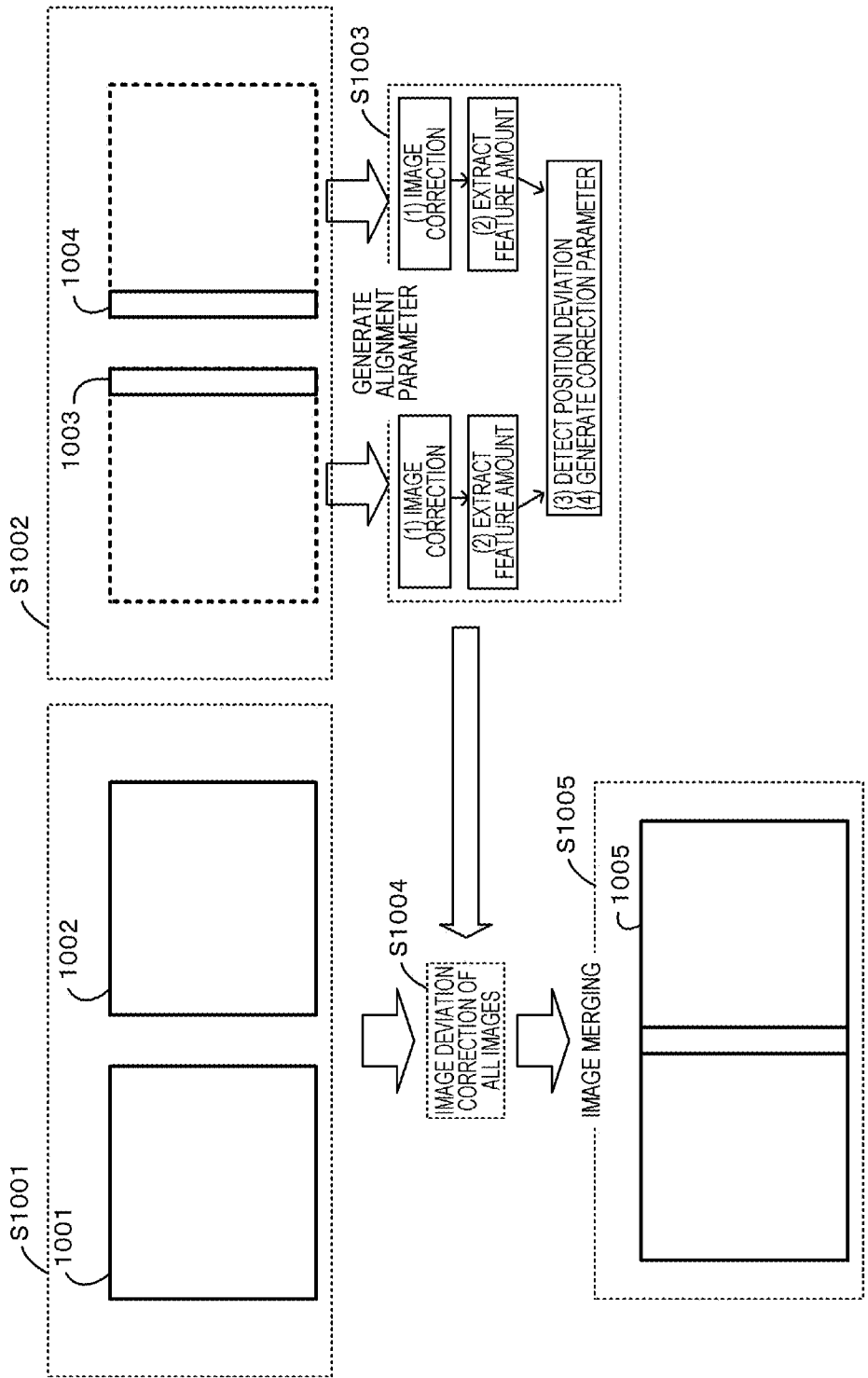
FIG. 10 is a schematic diagram illustrating a process of generating a merged image.

FIG. 10 is a schematic diagram illustrating a process of generating a merged image by means of the image processing unit 407. The process of performing alignment between the imaging tiles (divided regions) using the second image and generating a merged image using the first image is illustrated conceptually. In this embodiment, the first and second images are images with different depths of field.

In step S1001, a first image 1001 of the imaging tile (4, 6) 601 and a first image 1002 of the imaging tile (4, 7) 602 are illustrated. The first image is an image with a high resolution and can be obtained by opening the aperture stop 404 so that the NA is high, as described in FIGS. 1A and 1B. Since it is necessary to observe the minute structure of a half pitch of about 0.5 μm in a histological diagnosis or a cytological diagnosis of a pathological examination, it is necessary to obtain an image with high resolution for the observation.

In step S1002, a second image 1003 of the imaging tile (4, 6) 601 and a second image 1004 of the imaging tile (4, 7) 602 are illustrated. The second image is an image that has high contrast in a region in which the depth of field is deep and the amount of defocus is large, and can be obtained by narrowing the aperture stop 404 so that the NA is low, as described in FIGS. 2 and 3. As described in FIGS. 6A to 6C, even when image blur occurs in the alignment region in the first image, the image blur in the alignment region can be resolved by deepening the depth of field in the second image, for which the aperture stop 404 is narrowed. Since the second image is an image used to generate the alignment parameter, only the alignment region need be acquired. Here, since the merging of the adjacent imaging tiles is focused on, only the alignment region at the right end is acquired in the image 1003 and only the alignment region at the left end is acquired in the image 1004. However, for example, in order to perform the process of merging eight imaging tiles in the vicinity of the imaging tile (3, 4), it is necessary to acquire the alignment regions in the whole perimeter (the upper end, the right end, the lower end, and the left end) of the imaging tile (see FIGS. 5A and 5B).

Hereinafter, the first and second images will be described. Since a stained sample is observed in the first image, the first image is preferably a color image. However, the second image need not be a color image, but may be a monochrome image. Further, when extraction of a feature amount from the second image is considered, the second image is further preferably a monochrome image generated from brightness information of a color from which high contrast can be obtained. The color from which high contrast can be obtained can be specified by analyzing the second image and can be specified based on the sample staining method. For example, when the sample is a hematoxylin eosin stained (HE stained) sample, for example, violet-blue of hematoxylin is focused on and a B image signal is set for the monochrome image. The sample staining method can be obtained from the stain information relevant to the slide. For example, the stain information is read from a two-dimensional code or an IC chip attached to the slide or is given by user's input or by the input of data. Since the first image is required to have high resolution, the first image is preferably an image obtained by reading all of the pixels. However, since the feature amount may be extracted for the second image, the second image may be an image (for example, a thinned image) with lower resolution than the first image.

By setting the second image as a monochrome image, a low-resolution image, and/or an image including only some of the imaging tiles (divided regions), it is possible to obtain the advantages of shortening calculation time, reducing calculation cost, reducing the capacity of data required to be handled, and reducing power consumption. Further, by using, as the second image, a high-contrast monochrome image generated from the brightness information of a color obtained by the staining, it is possible to obtain the advantages of maintaining the feature amount extraction accuracy while reducing the required capacity of data.

In step S1003, the alignment parameter is generated from the second images 1003 and 1004 provided for the image merging. Each second image is subjected to image correction to correct the image deviation caused due to optical system aberration and the feature amount is extracted from the corrected image. Then, position deviation is detected by comparing the feature amounts of the second images and the correction parameter used for the image deviation correction is generated. Here, the image correction is performed using the same parameter as that of the image correction performed for the first images. The second and first images have only different depths of field and have the same imaging range (angle of view). Therefore, the correction parameter generated from the second images can be applied directly to the first images. However, as between the color image and the monochrome image, the image distortion degree is changed due to the influence of the chromatic aberration of magnification.

Accordingly, when a monochrome image is used as the second image, it is necessary to perform the image correction, taking into account the influence of the chromatic aberration of magnification.

In step S1004, the image deviation correction is performed on the first images 1001 and 1002 using the correction parameter generated from the second images 1003 and 1004.

In step S1005, a merged image 1005 produced by merging the first images 1001 and 1002 is generated.

As described above, by performing the alignment between the imaging tiles (divided regions) using the second images and generating the merged image using the first images, it is possible to improve the alignment accuracy in the image merging while maintaining the high resolution of the first images.

(Alignment)

FIGS. 11A to 11D are schematic diagrams illustrating the alignment of the imaging tiles (divided images). Hereinafter, the image blur occurring when the first images are used and realization of the alignment with high accuracy by using the second images in which blur is small as the countermeasure for the image blur will be described.

FIG. 11A illustrates the xz cross-sectional view of the imaging tile (4, 6) 601. FIG. 11B illustrates the xz cross-sectional view of the imaging tile (4, 7) 602. In FIGS. 11A and 11B, the xz planes 603 and 604 of FIG. 6C are decomposed and illustrated, and the alignment region (xz plane) 609 is illustrated by hatching. FIG. 11C is the xy top view of the imaging tile (4, 6) 601 and corresponds to the top view of FIG. 11A. Here, FIG. 11C corresponds to only one cross-section of FIG. 11A. However, to facilitate the description, the surface corrugation is the same in the entire cross-section. Likewise, FIG. 11D is the xy top view of the imaging tile (4, 7) 602 and corresponds to the top view of FIG. 11B. Here, FIG. 11D corresponds to only one cross-section of FIG. 11B. However, to facilitate the description, the surface corrugation is the same in the entire cross-section. In FIGS. 11C and 11D, cells (1103 denotes one cell) of the sample surface are illustrated, and the cells are assumed to be extracted as feature amounts.

When the correspondence of FIGS. 11A and 11C is viewed, the region of 3/4 on the right side of the alignment region (xy plane) 1101 is deviated from the depth of field, and thus becomes an image blur region 1104. Likewise, when the correspondence of FIGS. 11B and 11D is viewed, the region of 3/4 on the left side of the alignment region (xy plane) 1102 is deviated from the depth of field, and thus becomes an image blur region 1105. Since feature amount extraction accuracy deteriorates in a blurred region, correlation between the alignment regions (xy plane) 1101 and 1102 may not be taken using the first image. Accordingly, by narrowing the aperture stop 404 so that the NA is low and setting the depth of field to about 2 µm, a second image in which the image blur is small can be obtained, and thus the alignment can be performed with high accuracy. As the depth of field, about 50% DOF 4 µm (depth of field of about 8 µm) is considered to suffice in consideration of the correspondence to a thick sample, a margin of the surface corrugation, and guarantee of contrast at the end of the depth of field, as illustrated in FIG. 2. At this time, in stop 3 in which the aperture stop is narrowed, the imaging can be performed up to a structure with a half pitch of about 1.1 µm As described above, in regard to the image blur which is likely to occur in the first image, the extraction of the feature amount in the alignment can be performed with high accuracy by using the second image with the deep depth of field.

(Image Merging Process)

FIG. 12 is a flowchart illustrating the merging of the imaging tiles (divided images) by the image processing unit 407. The conceptual flow of the processes which are the point of the invention has been described in FIG. 10. Here, correspondence to a functional block will be described.

In step S1201, image correction such as distortion aberration correction is performed on the second image. When a monochrome image is used as the second image, the image correction is performed taking into account the influence of the chromatic aberration of magnification. This image correction is performed by the image correction unit 911 in the alignment parameter generation unit 904.

In step S1202, the feature amount of the second image is extracted. In a histological diagnosis or a cytological diagnosis of a pathological examination, cell organelles such as a nucleus or a cell membrane, a pylori bacterium, or the like can be obtained as a feature. This extraction of the feature amount is performed by the feature amount extraction unit 912 in the alignment parameter generation unit 904.

In step S1203, a relative position deviation amount between the second images is detected based on the extracted feature amount. The detection of the relative position deviation amount is performed by the position deviation detection unit 913 in the alignment parameter generation unit 904.

In step S1204, a position deviation correction amount (correction parameter) of each image is generated from the relative position deviation amount between the second images. By the image correction of step S1201, the first and second images can be considered as the equivalent images. Therefore, the correction parameter calculated from the second images can be applied even to the first images. The generation of the position deviation correction amount is performed by the correction parameter generation unit 914 in the alignment parameter generation unit 904.

The processes from step S1201 to step S1204 are processes performed on the second images.

In step S1205, development and correction are performed on the first images. Black-level correction, digital noise reduction (DNR), pixel flaw correction, brightness correction for individual variation of an imaging device or shading, a development process, a white balance process, an enhancement process, distortion aberration correction, magnification chromatic aberration correction, and the like are performed. The development and correction are performed by the development and correction unit 905.

In step S1206, image deviation correction is performed on the first images using the correction parameter generated from the second images. The image deviation correction is performed by the image deviation correction unit 906.

In step S1207, a merged image of the first images is generated. The image merging is performed by the merging unit 907.

The processes from step S1205 to step S1207 are processes performed on the first images.

In the above-described processing steps, the alignment is performed using the second images and the image merging is performed using the first images.

(Image Merging Sequence)

Figure 13:
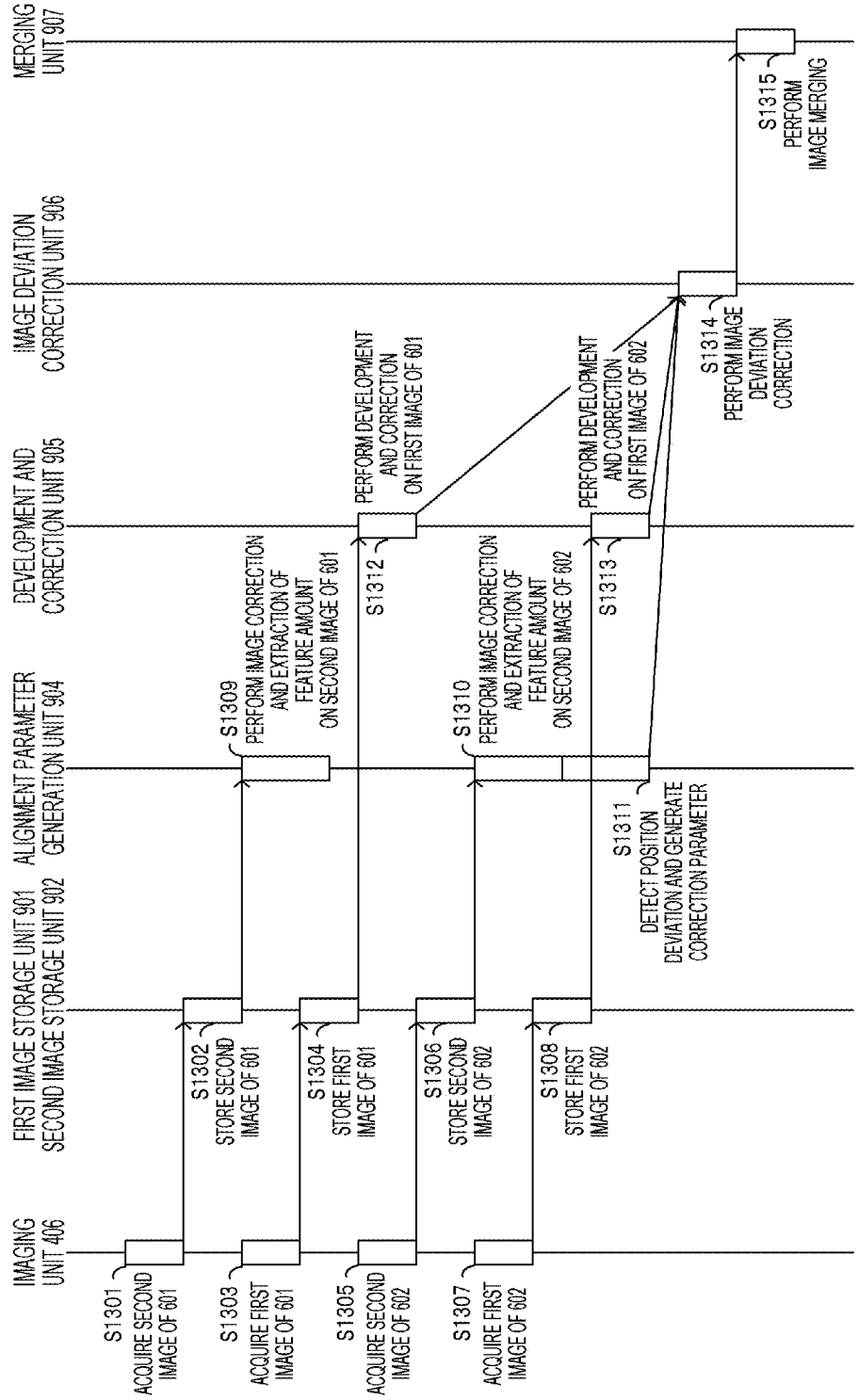
FIG. 13 is a diagram illustrating a sequence of the merging of the imaging tiles (divided images)

FIG. 13 is a diagram illustrating a sequence of the merging of the imaging tiles (divided images). The main functional blocks of the processes from the imaging to the merging are illustrated in the vertical axis. The direction from above to below along the vertical axis represents the lapse of time. Each rectangle indicates a process, and the arrows indicate flow of image data and control data.

In step S1301, the imaging unit 406 acquires the second image of the imaging tile (4, 6) 601.

In step S1302, the second image of the imaging tile (4, 6) 601 is stored in the second image storage unit 902 under the control of the CPU 903.

In step S1303, the imaging unit 406 acquires the first image of the imaging tile (4, 6) 601.

In step S1304, the first image of the imaging tile (4, 6) 601 is stored in the first image storage unit 901 under the control of the CPU 903. In step S1305, the imaging unit 406 acquires the second image of the imaging tile (4, 7) 602.

In step S1306, the second image of the imaging tile (4, 7) 602 is stored in the second image storage unit 902 under the control of the CPU 903.

In step S1307, the imaging unit 406 acquires the first image of the imaging tile (4, 7) 602.

In step S1308, the first image of the imaging tile (4, 7) 602 is stored in the first image storage unit 901 under the control of the CPU 903.

The acquisition of the images and the storage of the images in step S1301 to step S1308 are sequentially performed under the control of the CPU 903, as long as a busy signal is not received from the first image storage unit 901 or the second image storage unit 902.

In step S1309, the second image of the imaging tile (4, 6) 601 is read from the second image storage unit 902, and the alignment parameter generation unit 904 performs the image correction of this image and the extraction of the feature amount. This process may be performed without waiting for the end of the image storage process of step S1302.

In step S1310, the second image of the imaging tile (4, 7) 602 is read from the second image storage unit 902, and the alignment parameter generation unit 904 performs the image correction of this image and the extraction of the feature amount. This process may be performed without waiting for the end of the image storage process of step S1306.

In step S1311, the alignment parameter generation unit 904 generates the correction parameter. The position deviation detection unit 913 generates the correction parameter using the feature amount of the second image of the imaging tile (4, 6) 601 extracted in step S1309 and the feature amount of the second image of the imaging tile (4, 7) 602 extracted in step S1310.

In step S1312, the development and correction unit 905 performs the development and correction processes on the first image of the imaging tile (4, 6) 601. This process may be performed without waiting for the end of the image storage process of step S1304.

In step S1313, the development and correction unit 905 performs the development and correction processes on the first image of the imaging tile (4, 7) 602. This process may be performed without waiting for the end of the image storage process of step S1308.

In step S1314, the image deviation correction unit 906 performs the image deviation correction on the first image of the imaging tile (4, 6) 601 and the first image of the imaging tile (4, 7) 602 using the correction parameter generated in step S1311. This process is performed immediately after the processes of steps S1311 and S1313 end.

In step S1315, the merging unit 907 merges the first image of the imaging tile (4, 6) 601 and the first image of the imaging tile (4, 7) 602 that has been subjected to image deviation correction.

As described above, the second images and the first images are sequentially acquired temporally, and thus the second images are acquired prior to the first images. Thus, since the extraction of the feature amount from the second image and the acquisition of the first images can be performed simultaneously (in parallel), and the image deviation correction of step S1314 can be performed immediately after the development and correction processes of the imaging tile (4, 7) 602 in step S1313. There is thus no waiting time due to the extraction of the feature amount, and thus it is possible to shorten the processing time until the merging.

(Advantages of Embodiment)

In the configuration described above in this embodiment, the second image is an image that has a deeper depth of field than the first image. By performing the alignment between the divided regions using the second images and generating the merged image using the first images, it is possible to improve alignment accuracy in the image merging while maintaining the high resolution of the images that are merged.

By setting the first images to be color images and the second images to be monochrome images, by setting the first images to be images obtained by reading all of the pixels and the second images to be images with low resolution, and/or by causing the first images to include all of the imaging tiles (divided regions) and causing the second images to include only some of the imaging tiles (divided regions), it is possible to obtain the advantages of shortening the calculation time, reducing the calculation cost, reducing the required capacity of data, and reducing power consumption.

By using, as the second image, a high-contrast monochrome image that is generated based on the brightness information of a color obtained by the staining of the sample, it is possible to obtain the advantage of maintaining feature amount extraction accuracy while reducing the required capacity of data.

By sequentially acquiring the second images and the first images temporally and acquiring the second images prior to the first images, the extraction of the feature amount and the acquisition of the first images can be performed simultaneously, and thus the processing time until the merging can be shortened.

(Modification Example of Embodiment)

Hereinafter, an example of a modification of the above-described embodiment will be described. The first image is an image that has high resolution. On the other hand, its depth of field is shallow and image blur easily occurs for the surface corrugation of the sample. Accordingly, when the degree of the image blur of the first image is comprehended using the contrast of the image, and the contrast of the image is equal to or less than a threshold value, the first image is substituted with the second image. In this case, the second image is required to be set as an image (a color image, an image obtained by reading all of the pixels, and an image including all of the imaging tiles (divided regions)) that has the same attributes, other than depth of field, as the first image it is replacing.

(Imaging Function)

Figure 14:
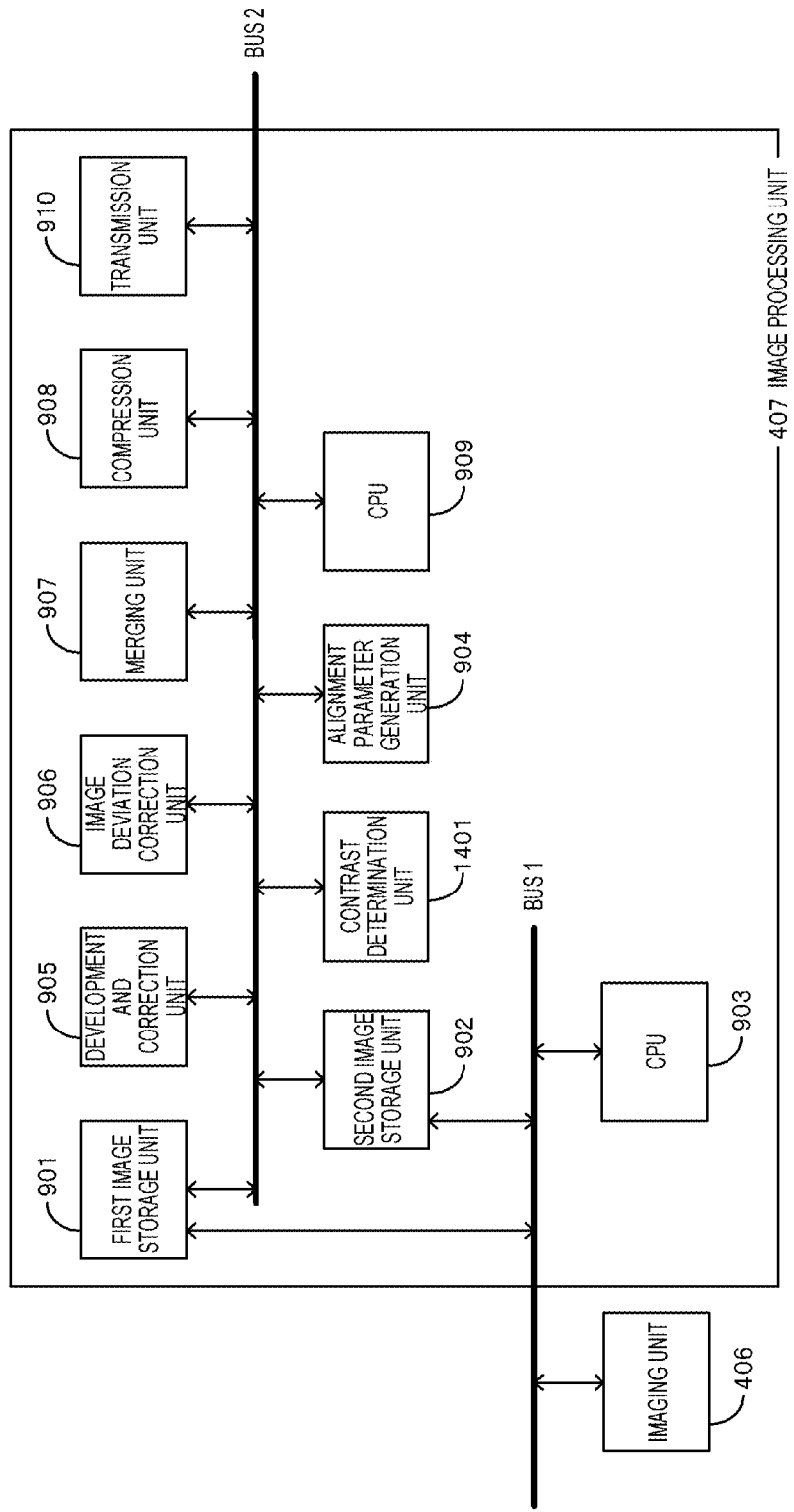
FIG. 14 is a functional block diagram relevant to the main imaging when contrast determination is performed.

FIG. 14 is a functional block diagram relevant to the main imaging when contrast determination is performed. A contrast determination unit 1401 is added to the functional block diagram relevant to the main imaging illustrated in FIG. 9. The functional blocks other than the contrast determination unit 1401 are the same as those described in FIGS. 9A and 9B.

The contrast determination unit 1401 determines the contrast of the first image. The contrast determination unit 1401 reads the first image stored in the first image storage unit 901 and performs contrast determination. The contrast of the first image can be expressed numerically using the contrast evaluation value described in FIG. 3. When the contrast evaluation value is equal to or greater than a threshold value, the first image is determined to be an image acceptable for observation, and thus is used directly for the image merging. When the contrast evaluation value is less than the threshold value, the first image is determined to be an image not suitable for observation, and thus the second image is used for the image merging instead. The threshold value is determined by having pathological diagnosticians view many pathological examination images (histological diagnosis images and cytological diagnosis images), and obtaining their feedback as to which are usable for observation in diagnosis.

In the above-described function block, when the first image is a blurred image that is unsuitable for the observation, the image merging can be performed using the second image instead, and thus a merged image in which image blur is small can be realized.

(Image Merging Process)

Figure 15:
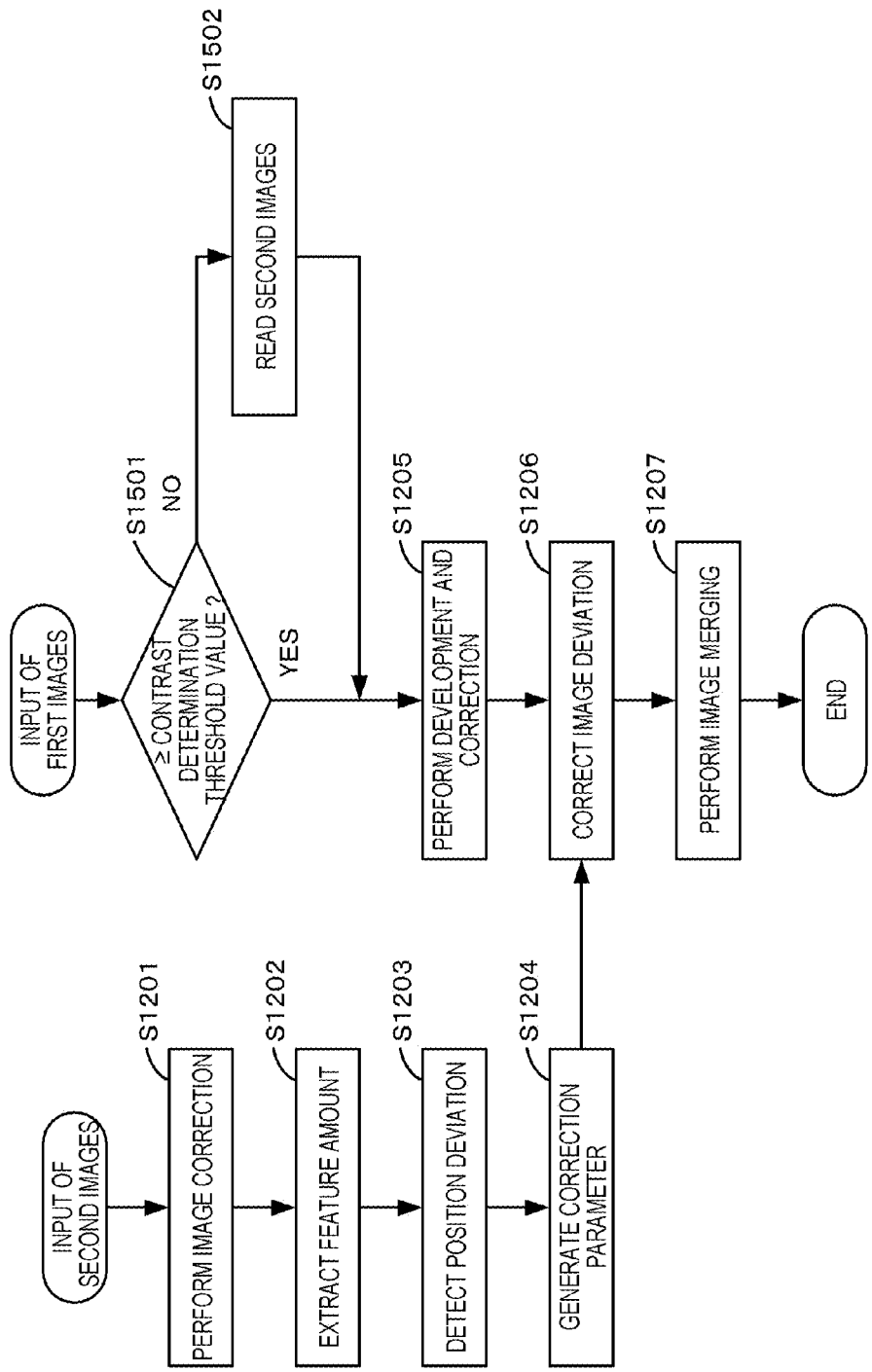
FIG. 15 is a flowchart illustrating the merging of the divided images when the contrast determination is performed.

FIG. 15 is a flowchart illustrating a process of merging the divided images when the contrast determination is performed. Step S1501 and step S1502 are added to the flowchart describing the merging of the imaging tiles (divided images) in FIG. 12. The processing steps other than step S1501 and step S1502 are the same as those described in FIG. 12.

In step S1501, the contrast determination is performed on the first image to determine whether the contrast evaluation value of the first image is equal to or greater than a threshold value. When the contrast evaluation value is equal to or greater than the threshold value, the process proceeds to step S1205. When the contrast evaluation value is less than the threshold value, the process proceeds to step S1502. This process is performed by the contrast determination unit 1401.

In step S1502, the second image is read. The CPU 909 reads the second image, and then the development and correction processes of step S1205 are performed.

In the processing steps described above, when it is determined that the first image is a blurred image not suitable for observation, the second image is used for the image merging instead of the first image.

(Advantages of Modification Example of Embodiment)

In the configuration according to the modified example of the above-described embodiment, when the first image is a blurred image not suitable for observation, the image merging can be performed using the second image, and thus a merged image in which the image blur is small can be realized.

Here, to facilitate the process, the contrast evaluation value of the first image is compared to the threshold value. However, the contrast evaluation values of the first and second images may instead simply be compared to each other and the image with the higher contrast evaluation value can be selected as the image used for the image merging.

Second Embodiment

Next, a second embodiment of the invention will be described with reference to the drawings. In the first embodiment, an example has been described in which the first and second images are acquired in all of the imaging tiles (divided regions) provided for the image merging. In this embodiment, on the other hand, an example will be described in which determination of the depth of field is performed and the processing time until the merging is shortened.

In the description of this embodiment, portions that are the same as those of the above-described first embodiment will not be described. The schematic configuration of the imaging apparatus illustrated in FIGS. 4A and 4B, the description of the imaging target region and the imaging tile illustrated in FIGS. 5A and 5B, the description of the focusing position and the depth of field illustrated in FIGS. 6A to 6C, the functional block diagrams of the main imaging illustrated in FIGS. 9A and 9B, the description of the alignment illustrated in FIGS. 11A to 11D, and the image merging sequence illustrated in FIG. 13 are the same as those of the first embodiment.

(Sample Surface Profile Measurement)

Figure 16:
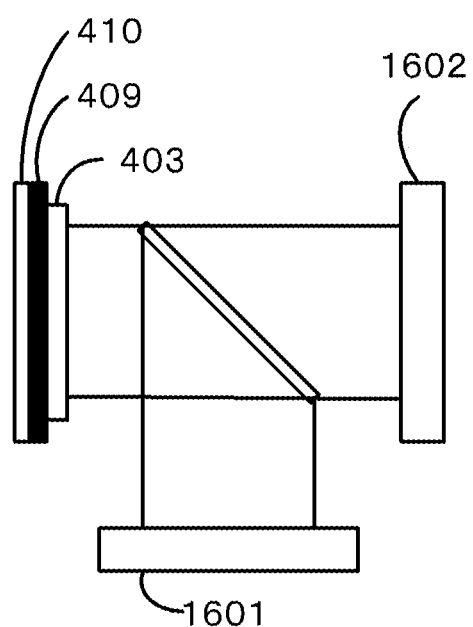
FIG. 16 is a schematic diagram illustrating sample surface profile measurement in the pre-measurement.

FIG. 16 is a schematic diagram illustrating a sample surface profile measurement in the pre-measurement. The sample surface profile measurement is used to measure the surface corrugation of the sample and includes a wave surface measurement light source 1601 and a wave surface measurement sensor 1602. The sample surface profile measurement is added to the pre-measurement system illustrated in FIG. 4B. The Shank-Hartmann sensor is used as the wave surface measurement sensor 1602. The wave surface measurement sensor 1602 measures light (deviation of an image of the sample surface) reflected from the sample surface when light is emitted from the wave surface measurement light source 1601, and comprehends the corrugated state of the sample surface.

With such a configuration, the pre-measurement system can comprehend the sample cross-sectional shape (the corrugated state of the sample surface) illustrated in FIG. 6C.

(Pre-Measurement Process and Main Imaging Process)

Figure 17A:
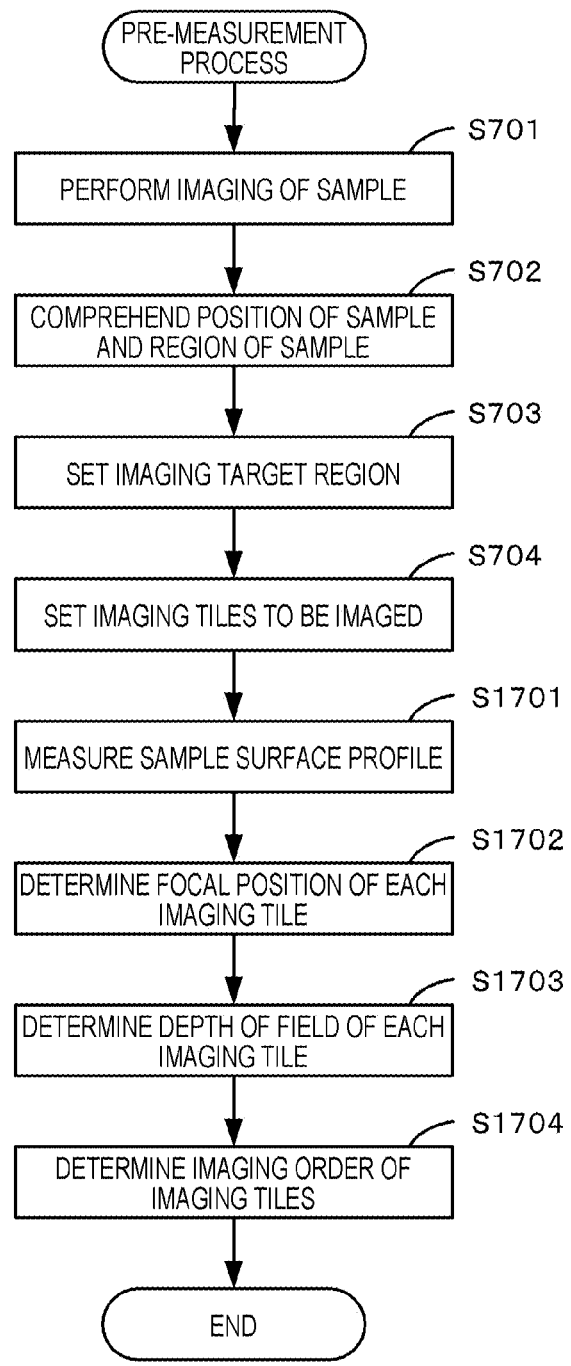
FIGS. 17A and 17B are flowcharts illustrating the pre-measurement and the main imaging when depth-of-field determination is performed.
Figure 17B:
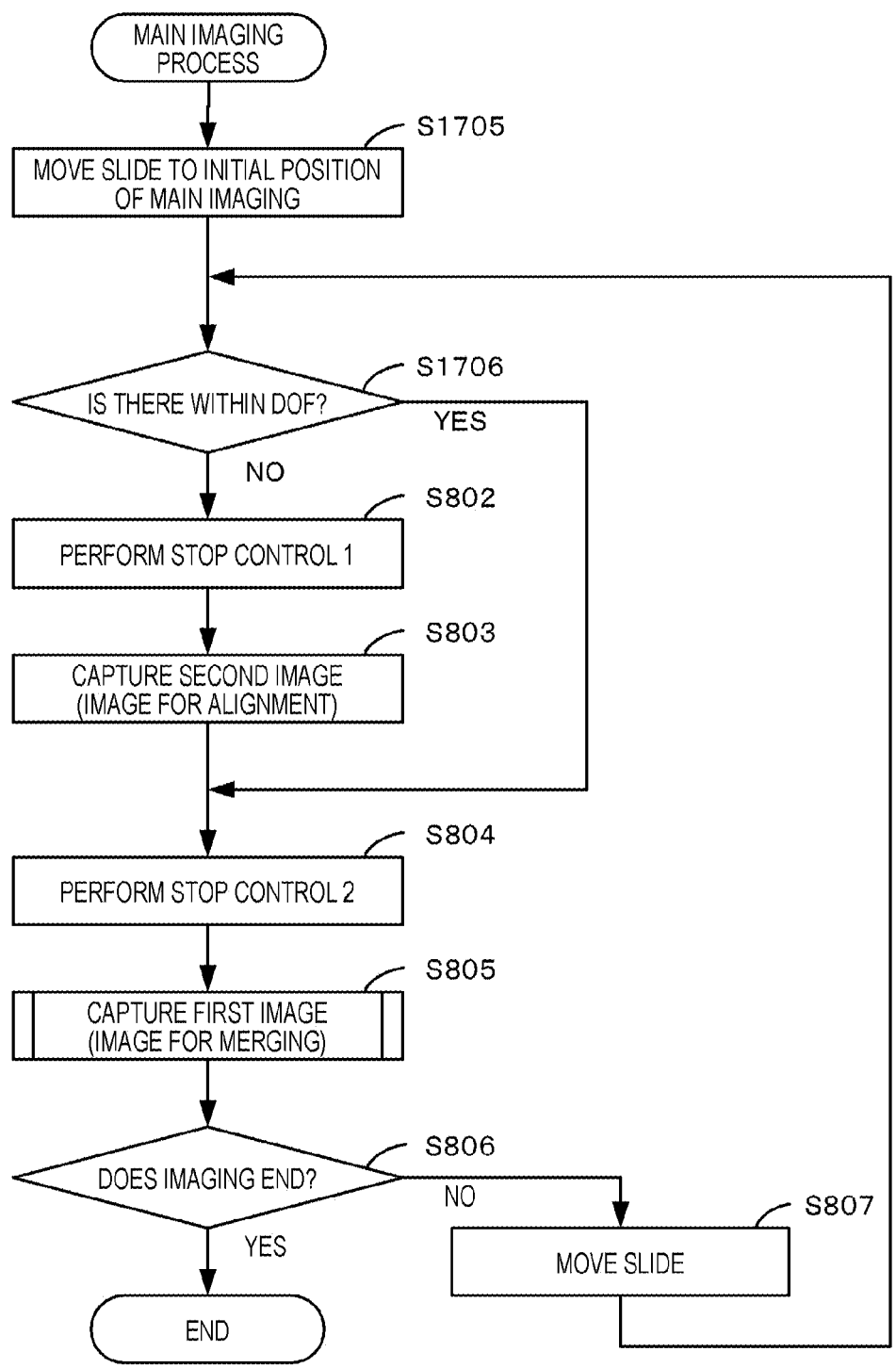

FIGS. 17A and 17B are flowcharts illustrating the pre-measurement and the main imaging when the determination of the depth of field is performed.

FIG. 17A is the flowchart illustrating the pre-measurement. Step S1701 to step S1704 are added to the flowchart describing the pre-measurement illustrated in FIG. 7. The processing steps other than step S1701 to step S1704 are the same as those described in FIG. 7.

In step S1701, the sample surface profile measurement is performed. The corrugated state of the sample surface can be comprehended through the sample surface profile measurement.

In step S1702, the focusing positions in all of the imaging tiles are determined based on the corrugated state of the sample surface.

In step S1703, the determination of the depth of field is performed on each imaging tile. Based on the focusing position determined in step S1702 and the depth of field ($\pm 0.5$ μm) in stop control 1, whether a sample surface corrugation range in the alignment region is within the depth of field is determined in all of the imaging tiles. The sample surface corrugation range is a range of the surface corrugation in the z direction in the alignment region. For example, when "z=0 μm" is set on the slide glass side in FIG. 6C, the sample surface corrugation range in the alignment region (xz plane) 609 is a range from "z=about 1.7 μm" to "z=about 2.8 μm." Here, in FIG. 6C, to facilitate the description, only one cross-section of the alignment region is illustrated, but in practice, the position of the sample and the region of the sample are comprehended in all of the cross-sections (the surface corrugation). Information regarding the focusing position in the imaging tile and information indicating whether the sample surface corrugation range is within the depth of field are stored as a table, since the information is used in step S1704 and the main imaging.

In step S1704, the imaging order of the imaging tiles is determined based on the information regarding the focusing positions of the imaging tiles acquired in step S1703 and the information indicating whether the sample surface corrugation range is within the depth of field. Among the plurality of imaging tiles (divided regions) provided in the image merging, imaging tiles for which the sample surface corrugation range is within the depth of field are referred to as first imaging tiles (first divided regions) and the other imaging tiles are referred to as second imaging tiles (second divided regions).

At this time, the imaging order is determined for all of the imaging tiles so that images of the first imaging tiles (first divided regions) are acquired temporally prior to images of the second imaging tiles (second divided regions).

In the processing steps described above, the depth of field is determined and the imaging order of the imaging tiles is determined in the pre-measurement.

FIG. 17B is a flowchart illustrating the main imaging. Step S1705 and step S1706 are added to the flowchart describing the main imaging illustrated in FIGS. 8A and 8B. The processing steps other than step S1705 and step S1706 are the same as those described in FIGS. 8A and 8B.

In step S1705, the slide is moved to the initial position (N=1; N is a serial number of the imaging tiles to be imaged) of the main imaging. The slide 403 is moved from the pre-measurement system to the main imaging system, and then the slide 403 is set so that the imaging tile to be first imaged is imaged based on the imaging order of the imaging tiles determined in step S1704 in the pre-measurement. Further, the position of the slide 403 in the z direction is set based on the information regarding the focusing position stored as the table in step S1703.

In step S1706, the determination of the depth of field is performed. The determination is performed based on information indicating whether the imaging tile stored as the table in step S1703 is within the depth of field. When the imaging tile is within the depth of field, the process proceeds to step S804. When the imaging tile is not within the depth of field, the process proceeds to step S802. When the imaging tile is within the depth of field, the second image need not be captured.

In the processing steps described above, the second image which is the image for the alignment and the first image which is the image for the merging are continuously captured in each imaging tile.

(Image Merging Sequence)

FIG. 18 is a diagram illustrating a sequence of the merging of the divided images when the determination of the depth of field is performed. The main functional blocks of the processes from the imaging to the merging are illustrated in the vertical axis. The direction from above to below along the vertical axis represents the lapse of time. Each rectangle indicates a process, and the arrows indicate flow of image data and control data. The same reference numerals are given to the same processes as those of the sequence described in the merging of the divided images in FIG. 13. The newly added process of step S1801 is indicated by a rectangle shown in solid black.

The alignment region of the imaging tile (4, 6) 601 is assumed to be within the depth of field in the determination of the depth of field. The alignment region of the imaging tile (4, 7) 602 is assumed not to be within the depth of field in the determination of the depth of field.

In step S1801, the first image (the alignment region of the first image) of the imaging tile (4, 6) 601 is read from the first image storage unit 901, and the image correction and the extraction of the feature amount is performed on this image by the alignment parameter generation unit 904. This process may be performed without wait of the end of the image storage process of step S1304. The target image is substituted with the first image from the second image in substantially the same process as that of step S1309.

Compared to the sequence illustrated in FIG. 13, the second image of the imaging tile (4, 6) 601 is not acquired and the image correction and the extraction of the feature amount of the imaging tile (4, 6) 601 are performed on the first image in FIG. 18. Since the second image of the imaging tile (4, 6) 601 is not acquired by performing the determination of the depth of field, the processing time until the merging is shortened. Further, since the imaging tile (4, 6) 601 determined to be within the depth of field in the determination of the depth of field is acquired temporally ahead, the processing time until the merging is shortened.

(Advantages of Embodiment)

According to this above-described embodiment, the process of determining the depth of field is provided to determine the depth of field of the regions provided for the image merging, only the first image is acquired for those divided regions that are determined to be within the depth of field, and for those divided regions the first image is used for the alignment. Accordingly, the processing time from the imaging to the merging can be shortened.

Further, the first divided regions and the second divided regions are sequentially acquired temporally in the first divided regions and the second divided regions provided for the image merging, and the divided regions determined to be within the depth of field in the process of performing the determination of the depth of field are acquired ahead. Accordingly, the processing time from the imaging to the merging can be shortened.

Third Embodiment

Next, a third embodiment of the invention will be described with reference to the drawings.

In the first embodiment, the first and second images are the images with the different depths of field. However, in this embodiment, first and second images are images with different focusing positions. In the first embodiment, the example has been described in which each first image and each second image are acquired from each of all the imaging tiles (divided regions) provided for the image merging, and this example can be applied to a sample for a histological diagnosis of a pathological examination. In this embodiment, however, an example will be described in which each imaging tile (divided image) is imaged to obtain a plurality of images and image merging is performed by selecting first and second images from the plurality of images. This example can be applied mainly to a sample of a cytological diagnosis of a pathological examination in which a z stack image is acquired. The term "z stack image" refers to imaging constituted by a plurality of two-dimensional images obtained through imaging while changing a focusing position. Each two-dimensional image with a focusing position constituting part of the z stack image is referred to as a "layer image".

In the description of this embodiment, the same portions as those described above in the first embodiment will be not described. The schematic configuration of the imaging apparatus illustrated in FIGS. 4A and 4B, the description of the imaging target region and the imaging tiles illustrated in FIGS. 5A and 5B, and the pre-measurement process illustrated in FIG. 7 are the same as those of the first embodiment.

(Z Stack Image Group and Depth of Field)

FIGS. 19A to 19C are schematic diagrams illustrating the z stack image group and the depth of field in a cytological diagnosis.

FIG. 19A is an upper view schematically illustrating the sample of the cytological diagnosis on the object plane. A sample 1901 of the cytological diagnosis is illustrated. When a process of merging an imaging tile (4, 6) 1902 with an imaging tile (4, 7) 1903 is focused on, the imaging tiles including overlapping regions are indicated by thick frame.

FIG. 19B is the expanded view illustrating the sample of the cytological diagnosis. The xz plane of the sample 1901 in a cut surface 1909 indicated in FIG. 19A is illustrated. An xz plane 1904 of the imaging tile (4, 6) 1902 and an xz plane 1905 of the imaging tile (4, 7) 1903 are illustrated. The gap between the slide glass and the cover glass in the cytological diagnosis is tens of μm First, the focusing position and the depth of field of the z stack image will be described. #1 to #5 represent five layer images of the imaging tile (4, 6) 1902 and each focusing position is indicated by a dashed line. The focusing positions of layer images #1' to #5' in the imaging tile (4, 7) 1903 are also indicated by dashed lines (reference numerals are not illustrated).

Hereinafter, the description will be made by focusing on the region of the xz plane 1904. The layer image #5 will be assumed to be observed. A depth of field 1907 of the layer image #5 which is an observation surface is a range indicated by a diagonal line (left downward diagonal line). A cell (one cell 1906 of the cells) scatters and floats in the sample. An alignment region (xz plane) 1908 for the xz planes 1904 and 1905 is an overlapping region between the imaging tile (4, 6) 1902 and the imaging tile (4, 7) 1903 and is a region used as the alignment region in the merging process. An image of the xy plane is used for the alignment in the image merging. Here, however, the alignment region (xz plane) indicates the xz plane which is one cross-sectional plane.

Hereinafter, a relation between the observation surface (#5; the first image) and the other surfaces (#1 to #4) in the alignment region (xz plane) 1908 will be described. Since a cell which has a feature necessary for the alignment is not present in the alignment region (xz plane) 1908 of the observation surface, the accuracy of correlation comparison of the feature amount deteriorates. On the other hand, since a cell which has a feature amount is present in the alignment region (xz plane) 1908 of #2 and #3, the alignment can be performed with high accuracy by comparing the observation surface. Since cells contributing to the alignment accuracy are present at random, the alignment on the observation surface may not always be performed with high accuracy. FIG. 19B illustrates a case in which one cross-sectional surface of the xz plane is considered. However, even when a three-dimension including the y axis is considered, there is a possibility that a cell is not present to the degree that the alignment accuracy in the alignment region (xyz space; the xy plane and the range of the depth of field on the z axis) can be ensured.

FIG. 19C is a table illustrating comparison of the contrast between the layer images #1 to #5 in the alignment region. The contrast of each layer image can be expressed numerically using the contrast evaluation value described in FIG. 3. The determination of the contrast of each layer image is performed using the contrast evaluation value in terms of whether the alignment can be performed with sufficient accuracy. The criterion of the determination of the contrast is determined by having pathological diagnosticians view many pathological examination images (histological diagnosis images and cytological diagnosis images) and provide information about which are suitable for observation. According to the determination of the contrast, it can be understood that the alignment accuracy is low in the layer image #5 which is the observation surface, but the alignment can be performed with high accuracy in the layer image #3. Compared to the first embodiment, the layer image #5 which is the observation surface is the first image and the layer image #3 is the second image.

As described above, since cells contributing to the alignment accuracy are present at random in the alignment region in which the merging process is performed, the alignment may not always be performed with high accuracy in the layer image (first image) of the observation surface. Therefore, the alignment is performed preferably with the layer image (second image) other than the observation surface, in which the alignment accuracy can be ensured.

(Imaging Function)

Figure 20A:
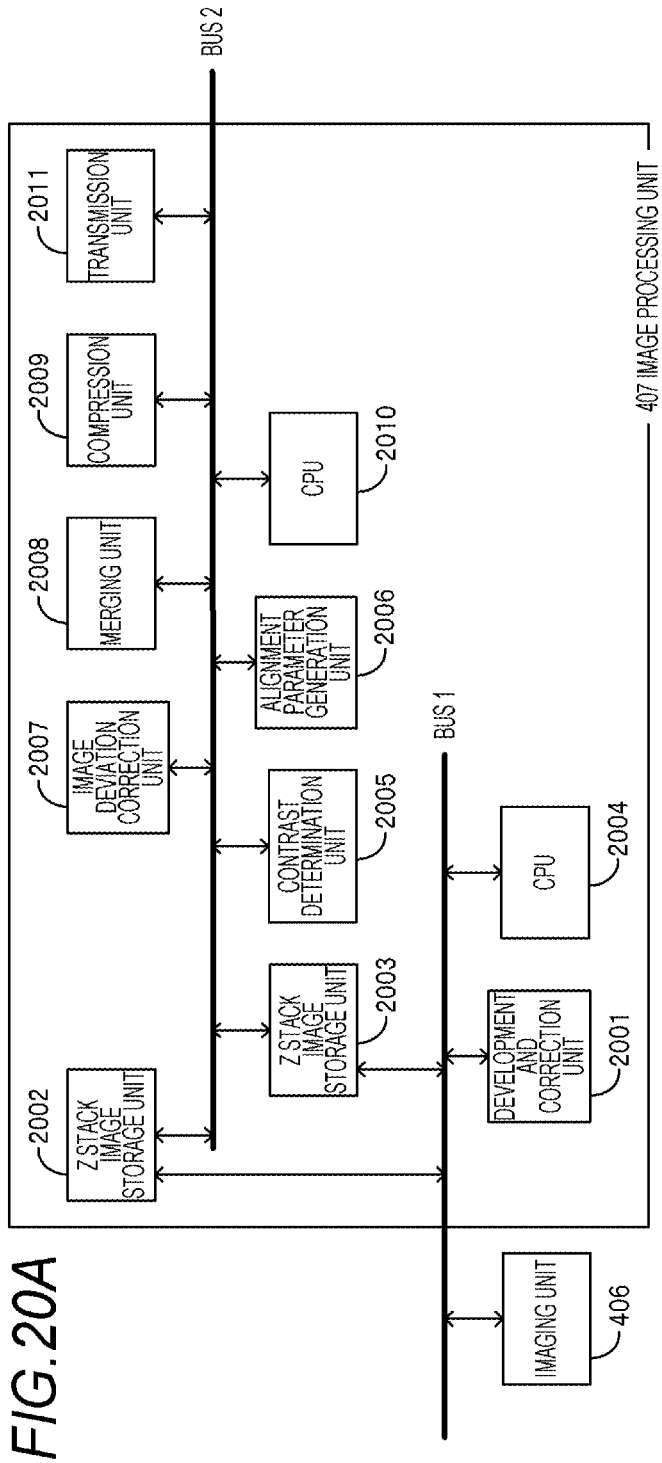
FIGS. 20A and 20B are functional block diagrams relevant to imaging of the z stack image group.
Figure 20B:
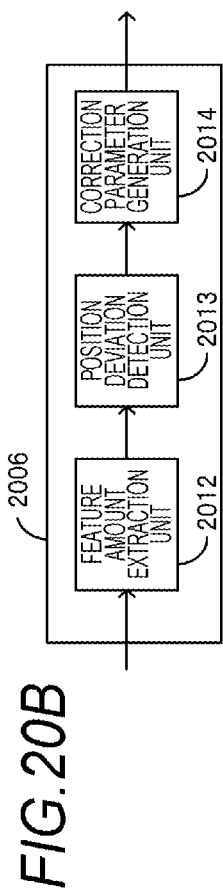

FIGS. 20A and 20B are functional block diagrams relevant to capturing of the z stack image. FIG. 20A illustrates the functional block diagram of an imaging unit 406 and an image processing unit 407. The image processing unit 407 includes a development and correction unit 2001, a z stack image storage unit 2002, a z stack image storage unit 2003, a CPU 2004, a contrast determination unit 2005, an alignment parameter generation unit 2006, an image deviation correction unit 2007, a merging unit 2008, a compression unit 2009, a CPU 2010, and a transmission unit 2011. FIG. 20B illustrates the functional block diagram of the alignment parameter generation unit 2006. The alignment parameter generation unit 2006 includes a feature amount extraction unit 2012, a position deviation detection unit 2013, and a correction parameter generation unit 2014.

The development and correction unit 2001 sequentially performs a development process and a correction process on each layer image of the z stack image captured by the imaging unit 406. Examples of the functions include black-level correction, digital noise reduction (DNR), pixel flaw correction, brightness correction for individual variation of an imaging device or shading, a development process, a white balance process, an enhancement process, distortion aberration correction, and magnification chromatic aberration correction.

The z stack image storage unit 2002 is a memory that stores the layer image group of one imaging tile (divided region) provided for the image merging. Writing on the z stack image storage unit 2002 is controlled by the CPU 2004 and reading is controlled by the CPU 2010.

The z stack image storage unit 2003 is the other memory that stores the layer image group of the other imaging tile (divided region) provided for the image merging. As in the z stack image storage unit 2002, writing on the z stack image storage unit 2003 is controlled by the CPU 2004 and reading is controlled by the CPU 2010.

The CPU 2004 is a CPU that controls timings at which the z stack images (layer image group) acquired by the imaging unit 406 are stored in the z stack image storage unit 2002 and the z stack image storage unit 2003 for each imaging tile (divided region).

The contrast determination unit 2005 determines the contrast of the alignment region using the layer image group of one imaging tile (divided region) provided for the image merging. The contrast of the image can be expressed numerically using the contrast evaluation value described in FIG. 3. The determination of the contrast of each layer image is performed using the contrast evaluation value in terms of whether the alignment can be performed with sufficient accuracy. The criterion of the determination of the contrast is determined by having pathological diagnosticians view many pathological examination images (histological diagnosis images and cytological diagnosis images) and provide information as to which ones are suitable for observation. Here, an error process is performed when any image does not satisfy the criterion of the determination of the contrast, and an image with the highest contrast can be selected among the layer images of the z stack images.

The alignment parameter generation unit 2006 generates a correction parameter used to join the imaging tiles (divided images) for the image (second image) of the surface determined to have high contrast by the contrast determination unit 2005. First, the feature amount extraction unit 2012 extracts a feature amount in the alignment region of each of the corrected images. Next, the position deviation detection unit 2013 detects relative position deviation between the images based on the feature amount. Then, the correction parameter generation unit 2014 generates a position deviation correction amount (correction parameter) of each image from the relative position deviation amount.

The image deviation correction unit 2007 performs position deviation correction on the image (first image) of the observation surface of each imaging tile using the correction parameter generated by the alignment parameter generation unit 2006.

The merging unit 2008 performs a process of joining the images (first images) of the observation surfaces subjected to the image deviation correction.

The compression unit 2009 performs a compression process on each block image output from the merging unit in order.

The CPU 2010 is a CPU that controls a timing of the layer image group stored in the z stack image storage unit 2002 is read and a timing at which the layer image group stored in the z stack image storage unit 2003 is read.

The transmission unit 2011 outputs a signal of a compression block image to a PC or a WS. A communication scheme such as a gigabit Ethernet by which a large amount of data can be transmitted is used for the transmission of the signal to the PC or the WS.

With the functional blocks described above, the alignment parameter is generated with the layer images (second images) with high contrast, and thus a merged image with high accuracy can be realized with the images (first images) of the observation surfaces.

(Concept of Image Merging Process)

FIG. 21 is a schematic diagram illustrating a process of generating a merged image using the z stack images. As the point of the invention, a process of performing alignment between the imaging tiles (divided regions) using the second image and generating a merged image using the first image is illustrated conceptually. In this embodiment, the first and second images are images with different focusing positions.

In step S2101, a layer image group (#1 to #5) 2101 of the imaging tile (4, 6) 1902 and a layer image group (#1' to #5') 2102 of the imaging tile (4, 7) 1903 are illustrated. The layer images #5 and #5' are the observation surfaces. The layer image groups are images (images with high resolution) of which contrast can be obtained in the region of a high spatial frequency and can be obtained by opening the aperture stop 404 so that the NA is high, as described in FIGS. 1A and 1B. Since it is necessary to observe the minute structure of a half pitch of about 0.5 µm in a histological diagnosis or a cytological diagnosis of a pathological examination, the image with a high resolution is necessary as the image for the observation.

In step S2102, the contrast in the alignment region is determined using the layer image group of one imaging tile (divided region) provided for the image merging.

In step S2103, a second image 2103 of the imaging tile (4, 6) 1902 and a second image 2104 of the imaging tile (4, 7) 1903 are illustrated. These second images are the images determined to have high contrast in step S2102 and are images suitable for generating the alignment parameter. Here, the layer images #3 and #3' are selected as the second images. Since the second image is an image used to generate the alignment parameter, only the alignment region may be acquired. Here, since the merging of the adjacent imaging tiles is focused on, only the alignment region at the right end is acquired in the image 2103 and only the alignment region at the left end is acquired in the image 2104. However, for example, in order to perform the process of merging eight imaging tiles in the vicinity of the imaging tile (3, 4), it is necessary to acquire the alignment regions in the circumference (the upper end, the right end, the lower end, and the left end) of the imaging tile (see FIGS. 5A and 5B).

Hereinafter, the first and second images will be described. Since the z stack images are assumed as the images to be captured in this embodiment, all of the captured images have the same attributes (a color image, an image obtained by reading all of the pixels, and an image including all of the imaging tiles (divided regions)). However, it is not necessary to use all of the image data as the second images in the processes from step S2102 to step S2104. Accordingly, since a stained sample is observed in the first image, the first image is preferably a color image. However, the second image need not be a color image, but may be a monochrome image. Further, when extraction of a feature amount from the second image is considered, the second image is further preferably a monochrome image generated from brightness information of a color from which high contrast can be obtained. The color from which high contrast can be obtained can be specified by analyzing the second image and can be specified from a sample staining method. For example, when the sample is a hematoxylin eosin stained (HE stained) sample, for example, violet-blue of hematoxylin is focused on and a B image signal is set for the monochrome image. Since the first image is required to have high resolution, the first image is preferably an image obtained by reading all of the pixels. However, since the feature amount may be extracted for the second image, the second image may be an image (for example, a thinned image) with low resolution.

By setting the second image as a monochrome image, a low-resolution image, and/or an image including only some of the imaging tiles (divided regions), it is possible to obtain the advantages of shortening a calculation time, reducing a calculation cost, reducing the capacity of data, and reducing power consumption. Further, by using the high-contrast monochrome image generated from the brightness information of a staining color as the second image, it is possible to obtain the advantages of maintaining the feature amount extraction accuracy while reducing the required capacity of data.

In step S2104, the alignment parameter is generated from the second images 2103 and 2104 provided for the image merging. The feature amounts of the second images are extracted and the position deviation is detected by comparing the feature amounts, and the correction parameter used for the image deviation correction is generated. The second and first images have only different focusing positions and have the same imaging range (angle of view). Therefore, the correction parameter generated from the second images can be applied directly to the first images. However, in the color image and the monochrome image, the image distortion degree is changed due to the influence of the chromatic aberration of magnification. Accordingly, when the monochrome image is used as the second image, it is necessary to perform image correction also for the influence of the chromatic aberration of magnification.

In step S2105, a first image 2105 of the imaging tile (4, 6) 1902 and a first image 2106 of the imaging tile (4, 7) 1903 are illustrated. These first images are images of the observation surface. Here, the layer images #5 and #5' are selected.

In step S2106, the image deviation correction is performed on the first images 2105 and 2106 using the correction parameter generated from the second images 2103 and 2104.

In step S2107, a merged image 2107 of the first images 2105 and 2106 is generated.

As described above, by performing the alignment between the imaging tiles (divided regions) using the second images and generating the merged image using the first images, it is possible to improve the alignment accuracy in the image merging.

Figure 22:
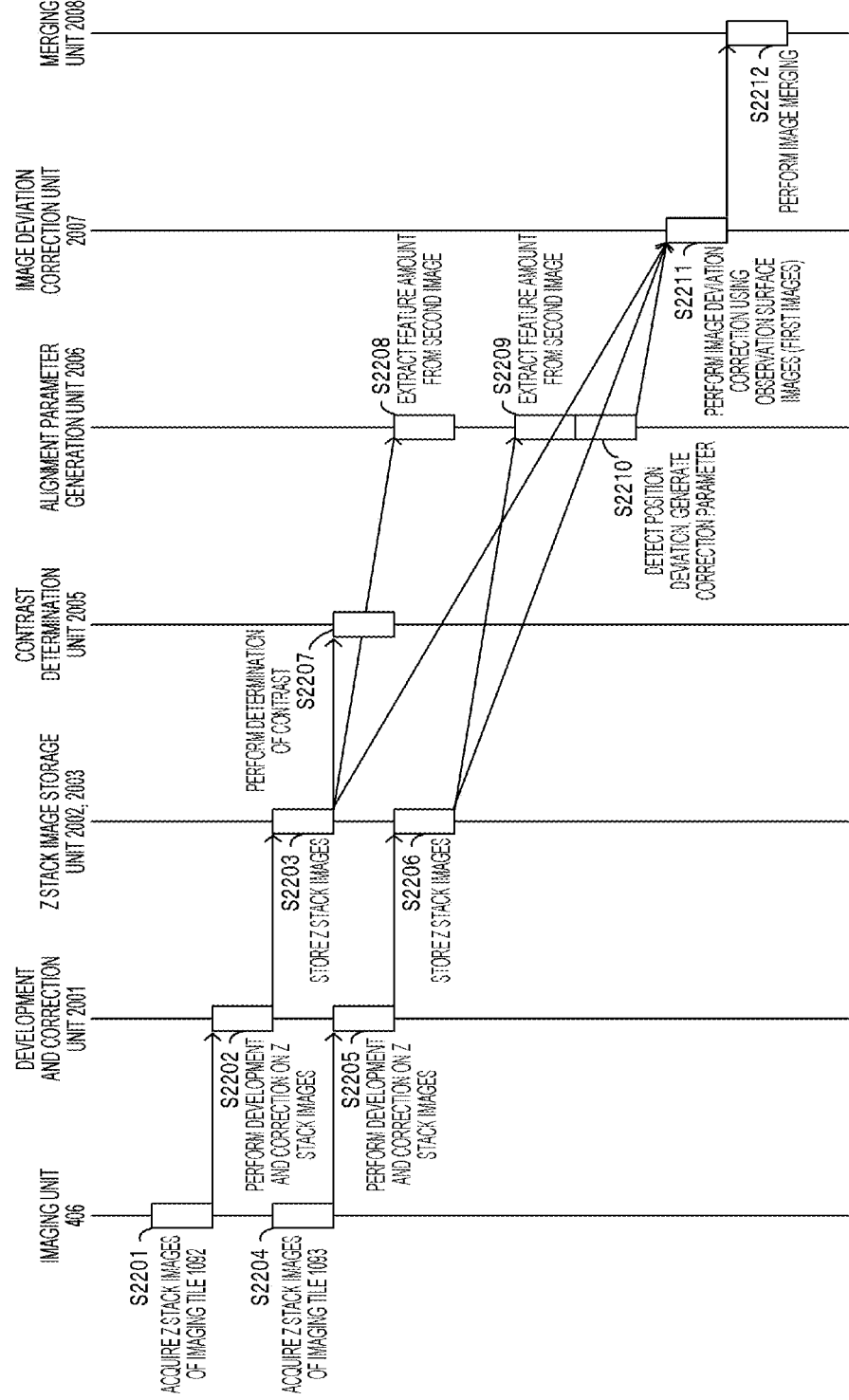
FIG. 22 is a diagram illustrating sequence of the merging of the divided images using the z stack image group.

FIG. 22 is a diagram illustrating a sequence of the merging of the divided images using the z stack images. The main functional blocks of the processes from the imaging to the merging are illustrated in the vertical axis. The direction from above to below along the vertical axis represents the lapse of time. Each rectangle indicates a process, and the arrows indicate flow of image data and control data.

In step S2201, the imaging unit 406 acquires the layer image group (#1 to #5) of the imaging tile (4, 6) 1902.

In step S2202, the development and correction unit 2001 performs the development and correction processes on the layer image group of the imaging tile (4, 6) 1902.

In step S2203, the layer image group of the imaging tile (4, 6) 1902 subjected to the development and correction processes is stored in the z stack image storage unit 2002 under the control of the CPU 2004.

In step S2204, the imaging unit 406 acquires the layer image group (#1' to #5') of the imaging tile (4, 7) 1903.

In step S2205, the development and correction unit 2001 performs the development and correction processes on the layer image group of the imaging tile (4, 7) 1903.

In step S2206, the layer image group of the imaging tile (4, 7) 1903 subjected to the development and correction processes is stored in the z stack image storage unit 2003 under the control of the CPU 2004.

The acquisition of the images and the storage of the images in step S2201 to step S2206 are sequentially performed under the control of the CPU 2004, as long as a busy signal is not received from the z stack image storage unit 2002 or the z stack image storage unit 2003.

In step S2207, the contrast determination unit 2005 determines the contrast of each layer image of the imaging tile (4, 6) 1902 in the alignment region.

In step S2208, the layer images (second images) of the focusing position determined to have high contrast by the contrast determination unit 2005 are read from the z stack image storage unit 2002 and the feature amount is extracted from the alignment region in the images.

In step S2209, the layer images (second images) of the focusing position determined to have high contrast by the contrast determination unit 2005 are read from the z stack image storage unit 2003 and the feature amount is extracted from the alignment region in the images.

In step S2210, the alignment parameter generation unit 2006 generates the correction parameter. The correction parameter is generated using the feature amount of the second image of the imaging tile (4, 6) 1902 extracted in step S2208 and the feature amount of the second image of the imaging tile (4, 7) 1903 extracted in step S2209.

In step S2211, the image deviation correction unit 2007 performs the image deviation correction on the observation surface (first image) of the imaging tile (4, 6) 1902 and the observation surface (first image) of the imaging tile (4, 7) 1903 using the correction parameter generated in step S2210. This process is performed immediately after the process of step S2210 ends.

In step S2212, the merging unit 2008 performs the process of merging the image (first image) of the observation surface of the imaging tile (4, 6) 1902 subjected to the image deviation correction with the image (first image) of the observation surface of the imaging tile (4, 7) 1903 subjected to the image deviation correction.

In the above-described processing sequence, in the case of the z stack images, the alignment is performed between the imaging tiles (divided regions) using the layer images (second images) of the focusing position determined to have the high contrast in the determination of the contrast, and the merged image is generated using the layer images (first images) of the observation surfaces.

In this embodiment, the first images are selected from the layer image group constituted by the z stack images. However, the first image may be a merged image obtained by performing depth merging of a plurality of layer images.

(Advantages of Embodiment)

In the configuration described above in this embodiment, the contrast determination process is provided to determine the contrast of the regions provided for the image merging, the first images are the images of the observation surfaces, and the second images are images determined to have the high contrast by the contrast determination unit. By performing the alignment between the divided regions using the second images and generating the merged image using the first images, it is possible to improve alignment accuracy in the image merging.

By setting the first images to be color images and the second images to be monochrome images, by setting the first images to be images obtained by reading all of the pixels and the second images to be images with low resolution, and/or by causing the first images to include all of the imaging tiles (divided regions) and causing the second images to include only some of the imaging tiles (divided regions), it is possible to obtain the advantages of shortening the calculation time, reducing the calculation cost, reducing the required capacity of data, and reducing power consumption.

By using, as the second image, a high-contrast monochrome image that is generated based on the brightness information of a color obtained by staining the sample, it is possible to obtain the advantage of maintaining the feature amount extraction accuracy while reducing the required capacity of data.

(Modification Example of Embodiment)

Hereinafter, an example of a modification of the above-described embodiment will be described. In the modification example, in the layers other than the observation surface (first image), images with a deep depth of field are assumed to reduce the number of z stack images. This method can be applied mainly to a case in which the observation surface is designated in advance in a sample of the cytological diagnosis of a pathological examination. In the modification example of the embodiment, the first and second images are images with both different focusing positions and different depths of field.

(z Stack Images and Depth of Field)

FIGS. 23A to 23C are schematic diagrams illustrating the focusing position and the depth of field in reduction in the number of z stack images.

FIG. 23A is an upper view schematically illustrating the sample of the cytological diagnosis on the object plane. A sample 2301 of the cytological diagnosis is illustrated. When a process of merging an imaging tile (4, 6) 2302 with an imaging tile (4, 7) 2303 is focused on, the imaging tiles including overlapping regions are indicated by thick frames in the FIG.

FIG. 23B is the expanded view illustrating the sample of the cytological diagnosis. The xz plane of the sample 2301 in a cut surface 2310 illustrated in FIG. 23A is illustrated. An xz plane 2304 of the imaging tile (4, 6) 2302 and an xz plane 2305 of the imaging tile (4, 7) 2303 are illustrated. The gap between the slide glass and the cover glass in the cytological diagnosis is tens of μm. First, the focusing position and the depth of field of each layer image of the z stack images will be described. #2 and #5 represent layer images of the imaging tile (4, 6) 2302 and each focusing position is indicated by a dashed line. The focusing positions of layer images #2' and #5' in the imaging tile (4, 7) 2303 are also indicated by dashed lines (reference numerals are not illustrated).

Hereinafter, the description will be made by focusing on the region of the xz plane 2304. The layer image #5 will be assumed to be observed. A depth of field 2307 of the layer image #2 which is not an observation surface is a range indicated by a diagonal line (right downward diagonal line) and is a range determined by the aperture stop 404. A depth of field 2308 of the layer image #5 which is an observation surface is a range indicated by a diagonal line (left downward diagonal line) and is a range determined by the aperture stop 404. The layer image #2 is an image captured by narrowing the aperture stop 404 and the layer image #5 is an image captured by opening the aperture stop 404. A cell (one cell 2306 of the cells) scatters and floats in the sample. An alignment region (xz plane) 2309 for the xz planes 2304 and 2305 is an overlapping region between the imaging tile (4, 6) 2302 and the imaging tile (4, 7) 2303 and is a region used as the alignment region in the merging process. An image of the xy plane is used for the alignment in the image merging. Here, however, the alignment region (xz plane) indicates the xz plane which is one cross-sectional plane.

Hereinafter, a relation between the observation surface (#5; the first image) and another surfaces (#2) in the alignment region (xz plane) 2309 will be described. Since a cell which has a feature necessary for the alignment is not present in the alignment region (xz plane) 2309 of the observation surface, the accuracy of correlation comparison of the feature amount deteriorates. On the other hand, in the alignment region (xz plane) 2309 of #2, since a cell which has a feature amount is sufficiently present by broadening the depth of field, the alignment can be performed with high accuracy by comparing the observation surface. Since cells contributing to the alignment accuracy are present at random, the alignment on the observation surface may not always be performed with high accuracy. FIG. 23B illustrates a case in which one cross-sectional surface of the xz plane is considered. However, even when a three-dimension including the y axis is considered, there is a possibility that a cell is not present to the degree that the alignment accuracy in the alignment region (xyz space; the xy plane and the range of the depth of field on the z axis) can be ensured.

FIG. 23C is a table illustrating comparison of the contrast between the layer images in the alignment region. The contrast of each layer image can be expressed numerically using the contrast evaluation value described in FIG. 3. The determination of the contrast of each layer image is performed using the contrast evaluation value in terms of whether the alignment can be performed with sufficient accuracy. The criterion of the determination of the contrast is determined by having pathological diagnosticians view many pathological examination images (histological diagnosis images and cytological diagnosis images) and provide information as to which ones are suitable for observation. According to the determination of the contrast, it can be understood that the alignment accuracy is low in the layer image #5 which is the observation surface, but the alignment can be performed with high accuracy in the layer image #2. The layer image #5 which is the observation surface is the first image and the layer image #2 is the second image. Here, an error process is performed when any layer image does not satisfy the criterion of the determination of the contrast, and a layer image with the highest contrast can be selected among the layer images of the z stack images.

As described above, since cells contributing to the alignment accuracy are present at random in the alignment region in which the merging process is performed, the alignment may not always be performed with high accuracy on the observation surface (first image). Therefore, by deepening the depth of field of the layer image (second image) other than the observation surface, the alignment accuracy can be sufficiently ensured in some cases.

(Advantage of Modification Example of Embodiment)

In the configuration according to the above-described modification example of the embodiment, by deepening the depth of field of the layer image (second image) other than the observation surface and sufficiently ensuring the alignment accuracy, the merged image can be realized with high accuracy for the layer image of the observation surface.

(Another Modification Example of Embodiment)

Hereinafter, another example of a modification of the above-described embodiment will be described. An example will be described in which determination of the depth of field is performed instead of the determination of the contrast of the image. This example is an example in which the second image is selected through the determination of the depth of field and can be applied mainly to a case in which the observation surface is designated in advance in a sample of the histological diagnosis from which z stack images are acquired.

(z Stack Images and Depth of Field)

FIGS. 24A to 24D are schematic diagrams illustrating the focusing position and the depth of field in reduction in the number of z stack images.

FIG. 24A is an upper view schematically illustrating the sample of the histological diagnosis on the object plane. A sample 2401 of the histological diagnosis is illustrated. When a process of merging an imaging tile (4, 6) 2402 with an imaging tile (4, 7) 2403 is focused on, the imaging tiles including overlapping regions are indicated by thick frames in the FIG.

FIG. 24B is the cross-sectional view illustrating the sample of the histological diagnosis. The xz plane of the sample 2401 in a cut surface 2408 illustrated in FIG. 24A is illustrated. An xz plane 2404 of the imaging tile (4, 6) 2402 and an xz plane 2405 of the imaging tile (4, 7) 2403 are illustrated. The sample 2401 is located at a region pinched a slide glass and a cover glass, and the surface corrugation of the sample 2401 is illustrated. The gap between the slide glass and the cover glass is 4 μm. An observation surface 2409 is indicated by a dashed line.

FIG. 24C is an expanded view illustrating the cross-section of the sample for the histological diagnosis. A focusing position and a depth of field of the z stack image will be described. #1 to #5 represent five layer images of the imaging tile (4, 6) 2402 and each focusing position is indicated by a dashed line. The focusing positions of layer images #1' to #5' in the imaging tile (4, 7) 2403 are also indicated by dashed lines (reference numerals are not illustrated).

Hereinafter, the description will be made by focusing on the region of the xz plane 2404. The layer image #1 will be assumed to be observed. A depth of field 2406 of the layer image #1 which is an observation surface is a range indicated by a diagonal line (left downward diagonal line). An alignment region (xz plane) 2407 for the xz planes 2404 and 2405 is an overlapping region between the imaging tile (4, 6) 2402 and the imaging tile (4, 7) 2403 and is a region used as the alignment region in the merging process. An image of the xy plane is used for the alignment in the image merging. Here, however, the alignment region (xz plane) indicates the xz plane which is one cross-sectional plane.

Hereinafter, a relation between the depth of field of the observation surface (#1; the first image) and the depth of field of the other surfaces (#2 to #5) in the alignment region (xz plane) 2407 will be described. The focusing position is uniquely determined in the z stack image. Therefore, as illustrated in FIG. 24C, the surface corrugation of the sample in the alignment region 2407 is deviated from the depth of field of the observation surface (first images) in some cases. Such a situation may be likely to occur when a portion in which the inclination of the surface corrugation is large is located near the alignment region between the imaging tiles. FIG. 24C illustrates a case in which one cross-sectional surface of the xz plane is considered. However, even when the xy plane is considered, there is a possibility that a case may occur in which the surface corrugation of the sample is deviated from the depths of field of the observation surface (first image) in a surface corrugation upraised like a mountain in the imaging tile (4, 6) 2402 and depressed like a valley in the imaging tile (4, 7) 2403. In this case, image blur may occur in the alignment region of the imaging tile (4, 6) 2402 and the imaging tile (4, 7) 2403. The occurrence of image blur (a blurred state) depends on the focusing position of the z stack image, the depth of field, and the surface corrugation of the sample 502.

FIG. 24D is a table illustrating comparison of the depth of field in the layer image group in the alignment region. The determination of the depth of field can be realized in the configuration described in the second embodiment (FIGS. 16 to 18). According to the determination of the depth of field, it can be understood that the alignment accuracy is low in the layer image #1 which is the observation surface, but the alignment can be performed with high accuracy in the layer image #2. The layer image #1 which is the observation surface is the first image and the layer image #2 is the second image.

As described above, by performing the determination of the depth of field instead of the determination of the contrast of the image and using the layer image (second image) other than the observation surface in the depth of field, the alignment accuracy can be sufficiently ensured.

(Advantage of Modification Example of Embodiment)

In the configuration according to the above-described modification example of the embodiment, by performing the determination of the depth of field instead of the determination of the contrast of the image and using the layer image (second image) other than the observation surface in the depth of field, the alignment accuracy can be ensured. Thus, the merged image can be realized with high accuracy.

Fourth Embodiment

Next, a fourth embodiment of the invention will be described with reference to the drawings. In the first to third embodiments, the examples have been described in which the two-dimensional imaging device is used as the imaging unit. In this embodiment, however, an example in which a one-dimensional imaging device is used will be described.

In the description of this embodiment, portions that are the same as those described above in the first embodiment will not be described. The schematic configuration of the imaging apparatus illustrated in FIGS. 4A and 4B, the description of the focusing position and the depth of field illustrated in FIGS. 6A to 6C, the description of the flow of the pre-measurement illustrated in FIG. 7, the description of the flow of the main imaging illustrated in FIGS. 8A and 8B, the functional block diagrams of the main imaging illustrated in FIGS. 9A and 9B, the description of the process of generating the merged image illustrated in FIG. 10, the description of the alignment illustrated in FIGS. 11A to 11D, the description of the merging flow illustrated in FIG. 12, and the image merging sequence illustrated in FIG. 13 are the same as those of the first embodiment.

(Imaging Target Region and Imaging Tile)

Figure 25A:
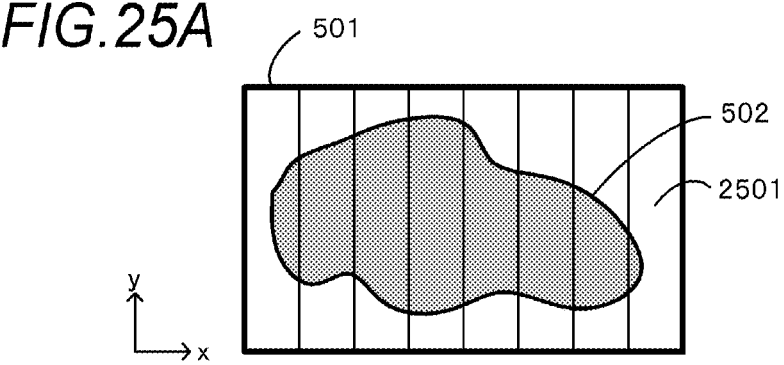
FIGS. 25A and 25B are schematic diagrams illustrating an imaging tile by a one-dimensional imaging device.
Figure 25B:
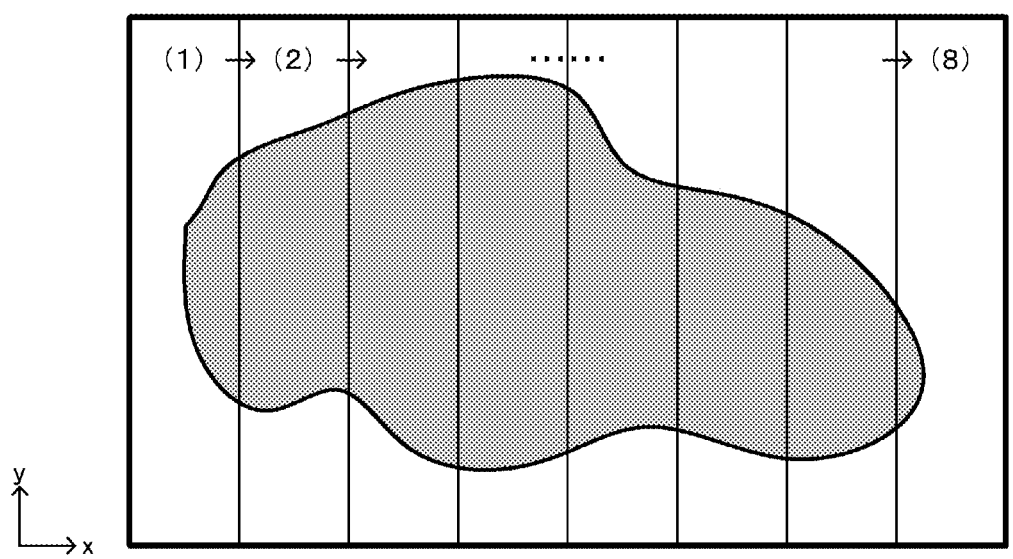

FIGS. 25A and 25B are schematic diagrams illustrating imaging tiles by a one-dimensional imaging device. The imaging apparatus according to this embodiment is an apparatus that acquires an optical microscope image of a sample on a slide 403 as a digital image with high resolution and a large size (wide angle of view). To make a high resolution and a large size (wide angle of view) compatible, an imaging target region is divided into several regions and the divided regions are imaged by the one-dimensional imaging device. Here, an imaging region to be imaged as the image of the entire sample is referred to as an imaging target region and a divided region is referred to as an imaging tile. The imaging target region is formed by merging the imaging tiles. Further, a plane perpendicular to an optical axis is referred to as an xy plane.

FIG. 25A is the schematic diagram illustrating the imaging target region and the sample on an object plane. The imaging target region 501 is divided into eight regions in the x direction. One region is an imaging tile 2501. The imaging target region 501 is a region set on the slide 403 by coordinates and is set for each slide 403 in consideration of the position of a sample 502 on the slide 403. In the pre-measurement, the coordinates of the imaging target region 501 on the slide 403 are set such that the sample 502 is located in the vicinity of the center of the imaging target region 501.

FIG. 25B is the schematic diagram illustrating the imaging tiles on the object plane. An imaging tile (L) represents an imaging tile located at an Lth in the x direction. As an imaging example of the plurality of divided regions (imaging tiles), arrows indicate an imaging order in which the imaging tile (1) to the imaging tile (8) are imaged in the x direction. In consideration of the merging of the imaging tiles, an interest imaging tile and the imaging tiles to the right and left of the interest imaging tile are subjected to an image merging process. When the imaging tile (3) is an interest imaging tile, the imaging tile (3) and two imaging tiles, the imaging tiles (2) and (4) are subjected to the image merging process. In the merging process, the adjacent imaging tiles have mutually overlapping regions, and the overlapping regions are used as alignment regions. However, in FIGS. 25A and 25B, the alignment regions are not illustrated.

Here, the case has been described in which all of the imaging tiles of the imaging target region 501 are imaged. However, when there are imaging tiles in which the sample 502 is not present, these imaging tiles need not be imaged and may be skipped. Thus, it is possible to obtain the advantages of shortening an imaging time due to reduction in the number of times imaging and reducing a memory capacity due to a reduction in the number of captured images.

As described above, the imaging apparatus divides the imaging target region into several imaging tiles (divided regions), sequentially images the imaging tiles, and performs the merging process of merging each imaging tile with all of the imaging tiles in the vicinity of each imaging tile.

(Focal Position and Depth of Field)

In FIG. 6A, the imaging tiles imaged by the two-dimensional imaging device are illustrated. When FIG. 6A is substituted with FIGS. 25A and 25B, the same description can be made even in the one-dimensional imaging device. Even when the position of the one-dimensional imaging device is moved in the z direction so as to be suitable for the surface corrugation of the sample 502 in order to take focus, the focusing position 605 is a surface obtained by performing straight-line approximation on the surface of the sample 502 by the least square method or the like, and thus can be described as the focusing position illustrated in FIG. 6C. When the one-dimensional imaging device is used, the image blur may occur in the alignment region in which the merging process is performed in the first image, in which the depth of field is narrow, due to the focusing position in each imaging tile, the depth of field, and the surface corrugation of the sample in some cases. Therefore, by using the second images with a deep depth of field, the alignment accuracy can be ensured, and thus the merged image can be realized with high accuracy.

(Advantages of Embodiment)

In the configuration described above in this embodiment, the second image is an image that has a deeper depth of field than the first image. By performing the alignment between the divided regions using the second images and generating the merged image using the first images, it is possible to improve alignment accuracy in the image merging while maintaining the high resolution of the first images.

As in the first embodiment, by setting the first images to be color images, the second images to be monochrome images, setting the first images to be images obtained by reading all of the pixels, setting the second images to be images with low resolution, causing the first images to include all of the imaging tiles (divided regions), and causing the second images to include some of the imaging tiles (divided regions), it is possible to obtain the advantages of shortening the calculation time, reducing the calculation cost, reducing the required capacity of data, and reducing power consumption.

By using, as the second image, a high-contrast monochrome image that is generated based on the brightness information of a color obtained by the staining the sample, it is possible to obtain the advantage of maintaining the feature amount extraction accuracy while reducing the capacity of the data.

By sequentially acquiring the second images and the first images temporally and thus acquiring the second images prior to the first images, the extraction of the feature amount and the acquisition of the first images can be performed simultaneously, and thus the processing time until the merging can be shortened.

Fifth Embodiment

Next, a fifth embodiment of the invention will be described with reference to the drawings. In the first to fourth embodiments, the examples have been described in which the single imaging device is used as the imaging unit. In this embodiment, however, an example in which a plurality of imaging devices are used will be described.

In the description of this embodiment, portions that are the same as those described above in the first embodiment will not be described. The description of the imaging tiles illustrated in FIGS. 5A and 5B, the description of the focusing position and the depth of field illustrated in FIGS. 6A to 6C, the description of the flow of the pre-measurement illustrated in FIG. 7, the description of the flow of the main imaging illustrated in FIGS. 8A and 8B, the functional block diagrams of the main imaging illustrated in FIGS. 9A and 9B, the description of the process of generating the merged image illustrated in FIG. 10, the description of the alignment illustrated in FIGS. 11A to 11D, the description of the merging flow illustrated in FIG. 12, and the image merging sequence illustrated in FIG. 13 are the same as those of the first embodiment.

(Configuration of Imaging Apparatus)

Figure 26A:
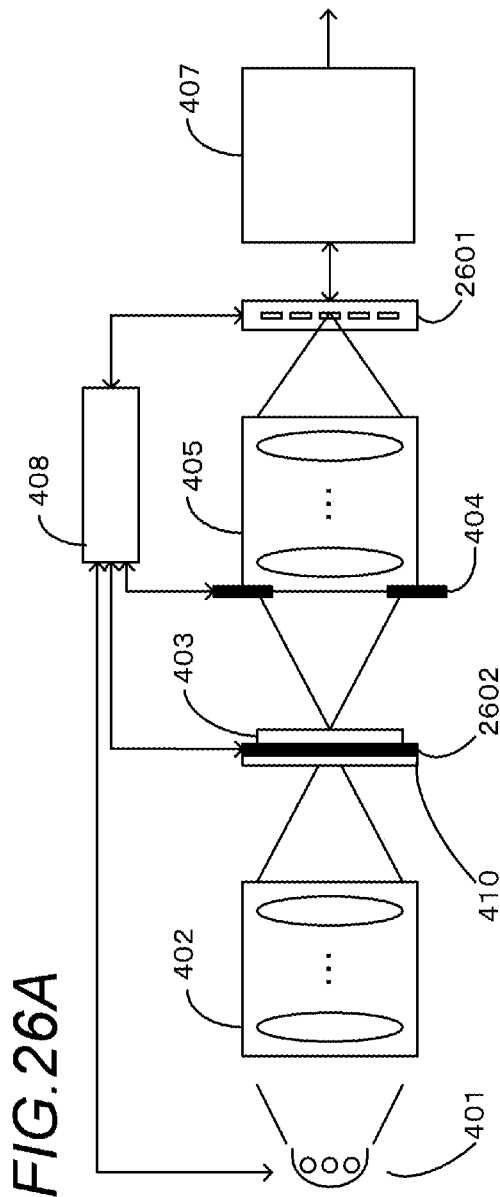
FIGS. 26A and 26B are schematic diagrams illustrating the schematic configuration of an imaging apparatus.
Figure 26B:
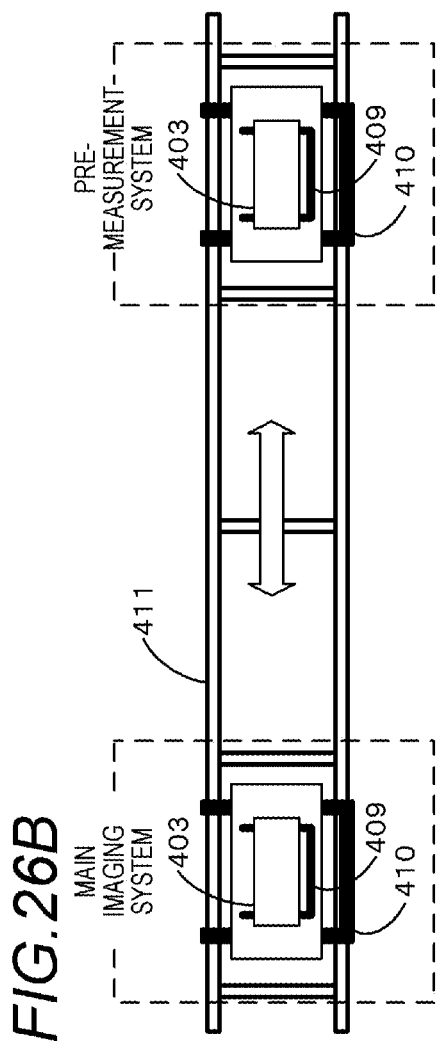

FIGS. 26A and 26B are schematic diagrams illustrating the schematic configuration of an imaging apparatus. The imaging apparatus is an apparatus that acquires an optical microscope image of a sample as a subject on a slide 403 as a digital image with high resolution and a large size (wide angle of view). Compared to the schematic configuration of the imaging apparatus illustrated in FIGS. 4A and 4B, the imaging unit 2601 and the XY movement mechanism 2602 are different. The functional blocks other than the imaging unit 2601 and the XY movement mechanism 2602 are the same as those described in FIGS. 4A and 4B.

The imaging unit 2601 is an imaging unit that includes a plurality of two-dimensional imaging devices. As the two-dimensional imaging device, a CMOS image sensor or a CCD image sensor is used. The imaging unit 2601 includes the plurality of two-dimensional imaging devices and a correlated double sampling circuit (CDS circuit), an auto-gain control circuit (AGC circuit), an analog-to-digital conversion circuit (AD conversion circuit), and an auto-focus function included in each two-dimensional imaging device. A digital signal of a captured image is transmitted from the imaging unit 2601 to the image processing unit 407.

The XY movement mechanism 2602 includes an XY plane movement mechanism that performs control such that the sample is located in the vicinity of the middle of an imaging screen. A plane perpendicular to the optical axis is referred to as an xy plane and the optical axis direction is referred to as the z direction. The xy plane position of the sample on the slide 403 is comprehended through pre-measurement to be described with reference to FIG. 26B. The imaging control unit 408 controls the xy positions of the slide 403 based on information regarding the pre-measurement. The positions of the slide 403 and the imaging unit 2601 in the z direction are determined using the auto-focus function of the imaging unit 2601 and the z direction of the two-dimensional imaging device is controlled by the imaging control unit 408. The auto-focus function can be realized by a contrast AF or a phase difference AF, used widely in practice.

With the above-described configuration, it is possible to capture a digital image with the high resolution or a large size of the sample and display the acquired image.

(Movement Mechanism of Imaging Element)

Figure 27A:
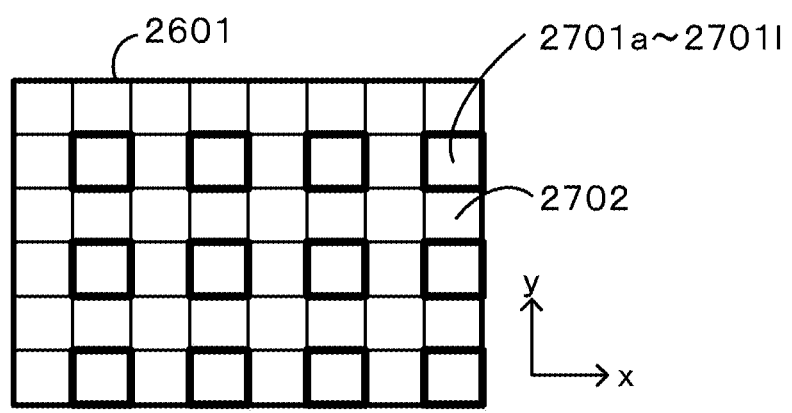
FIGS. 27A and 27B are schematic diagrams illustrating large screen imaging by a plurality of imaging devices and a movement mechanism of the imaging device.
Figure 27B:
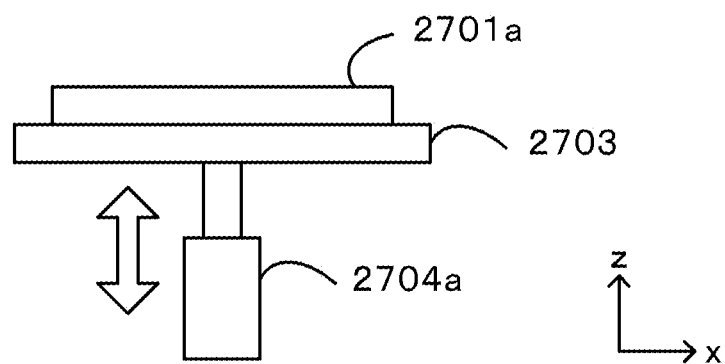

FIGS. 27A and 27B are schematic diagrams illustrating large screen imaging by the plurality of imaging devices and the movement mechanism of the imaging device.

FIG. 27A schematically illustrates a relation between the imaging devices 2701a to 2701l and imaging tiles 2702. The imaging unit 2601 includes a plurality of two-dimensional imaging devices discretely arrayed two-dimensionally in the X and Y directions with a gap therebetween. In this embodiment, 12 two-dimensional imaging devices 2701a to 2701l of 4 columns×3 rows are installed. Such imaging devices may be mounted on the same substrate or may be mounted on different substrates. To distinguish the individual imaging devices from each other, letters a to d are given in order to the reference numerals from the left of the 1st row, letters e to h are given in the 2nd row, and letters i to l are given in the 3rd row. To facilitate the illustration, abbreviated "2701a to 2701l" are used in the drawing. The same also applies to the other drawings.

FIG. 27B schematically illustrates the Z movement mechanism included in each imaging device. The imaging device 2701a is held by an imaging device holding plate 2703. By moving the imaging device holding plate 2703 in the z direction by a Z movement mechanism 2704a, adjustment (interval adjustment between the imaging device 2701a and the slide 403) of the focusing position is performed. The Z movement mechanism is included all of the imaging devices and can control the focusing position independently for each imaging tile. With the above-described configuration, it is possible to acquire an image for which a focusing position is controlled for each imaging tile.

(Order of Division Imaging)

Figure 28A:
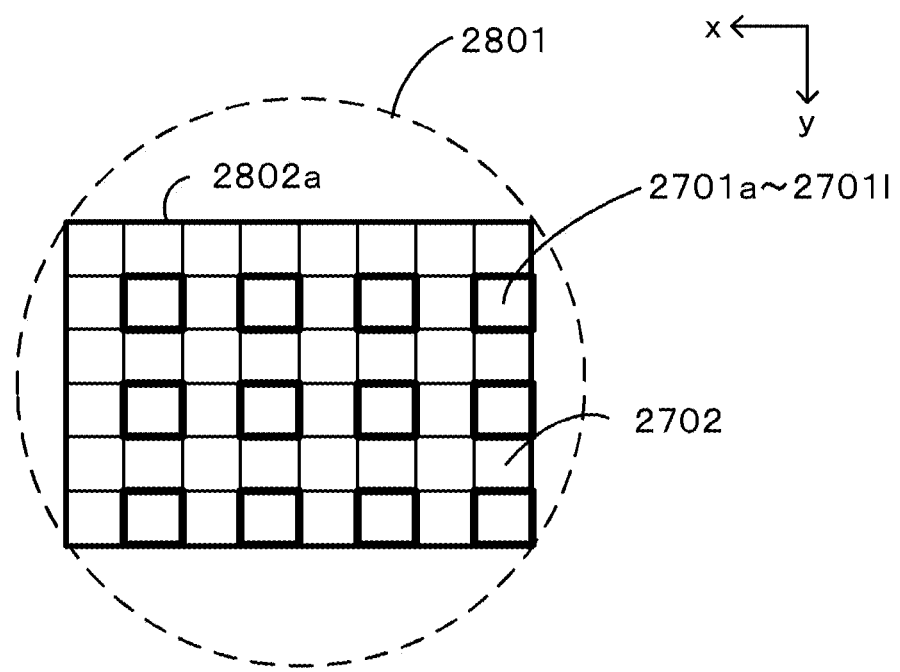
FIGS. 28A and 28B are schematic diagrams illustrating large screen imaging by slide movement in the main imaging.
Figure 28B:
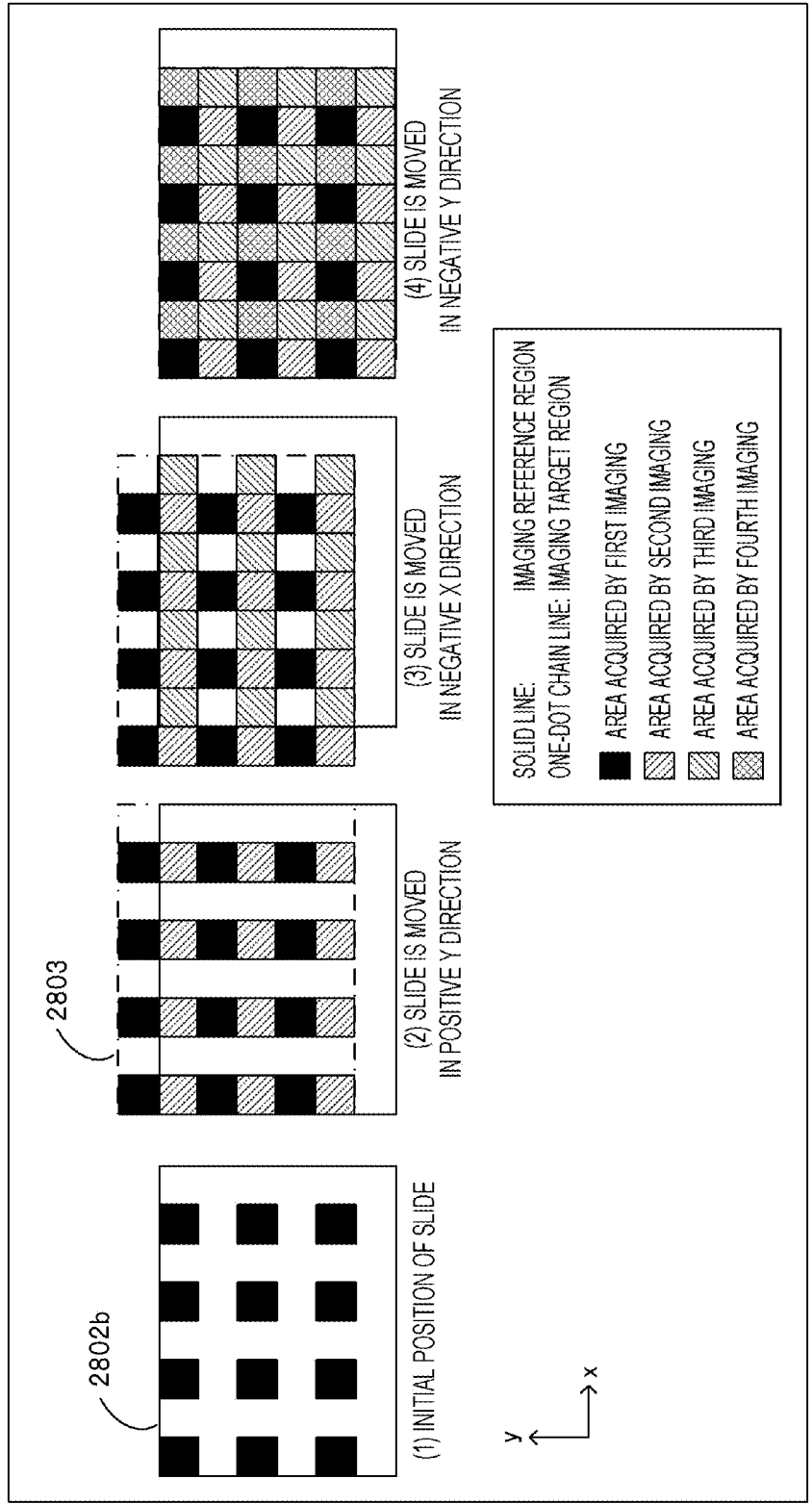

FIGS. 28A and 28B are schematic diagrams illustrating large screen imaging by movement of the slide in the main imaging.

FIG. 28A schematically illustrates a positional relation between the imaging devices 2701a to 2701l and an imaging reference region 2802a on the image plane. The illustrated sample of the object plane is assumed to be formed on the image plane as an inverted image. The imaging reference region is a region that is present as a reference position of the object plane without dependency on the position of the slide. When the imaging reference region is illustrated in the image plane, the imaging reference region is illustrated as an imaging reference region 2802a. When the imaging reference region is illustrated in the object plane, the imaging reference region is illustrated as an imaging reference region 2802b. The imaging reference region is a fixed region with respect to the fixedly arranged imaging optical system 405, but a relative position relation between the imaging reference region and the slide 403 is varied with the movement of the slide 403. As the region of the sample on the slide 403, an imaging target region 2803 is defined separately from the imaging reference region 2802b. When the slide 403 is located at the initial position (described below), the imaging reference region 2802b and the imaging target region 2803 are identical with each other. A position relation among the imaging reference region 2802a on the image plane, the imaging devices 2701a to 2701l, and an effective visual field 2801 of an imaging optical system 405 is fixed. To simplify the description, the influence of a distortion aberration of the imaging optical system 405 is ignored.

(1) to (4) of FIG. 28B are schematic diagrams used to easily describe how the imaging target region 2803 is imaged by the imaging devices 2701a to 2701l, when the slide 403 is moved by the XY movement mechanism 2602. When the entire region is imaged during the movement of the slide 403 (the imaging target region 2803), equal interval movement of the imaging target region 2803 on the object plane is considered to be simple, as illustrated in (1) to (4) of FIG. 28B in order to exclude necessity of the consideration of the distortion aberration. In practice, after the divided regions are imaged by the imaging devices 2701a to 2701l, distortion aberration correction suitable for each imaging device is necessary in the development and correction unit. However, when only the imaging of the entire imaging target region 2803 without a gap is considered, only the equal interval movement of the imaging target region 2803 on the object plane need be considered. In (1) of FIG. 28B, the area acquired by the first imaging is indicated by solid blacks. At the first imaging position (initial position), an emission wavelength of the light source is switched and each image of RGB primaries is acquired. When the slide 403 is located at the initial position, the imaging reference region 2802b (solid line) and the imaging target region 2803 (one-dot chain line) are identical with each other. In (2) of FIG. 28B, after the slide 403 is moved in the positive y direction by the movement mechanism, an area acquired by the second imaging is indicated by a diagonal line (left downward diagonal line). In (3) of FIG. 28B, after the slide 403 is moved in the negative x direction by the movement mechanism, an area acquired by the third imaging is indicated by a reverse diagonal line (right downward diagonal line). In (4) of FIG. 28B, after the slide 403 is moved in the negative Y direction by the movement mechanism, an area acquired by the fourth imaging is indicated by hatching. Further, to perform the rear-stage merging process in a simple sequence, the number of read pixels in the y direction in the divided regions adjacent to each other in the x direction on the object plane are preferably substantially identical. Further, in order for the merging unit 107 to perform the merging process, the overlapping region between the adjacent imaging devices is necessary. However, to facilitate the description, the overlapping region is not illustrated here.

As described above, the entire imaging target region can be imaged without a gap by performing the imaging four times (the number of times the slide is moved by the XY movement mechanism is three times) by the plurality of imaging devices.

(Advantages of Embodiment)

In the configuration described above in this embodiment, the second image is an image that has a deeper depth of field than the first image. By performing the alignment between the divided regions using the second images and generating the merged image using the first images, it is possible to improve alignment accuracy in the image merging while maintaining the high resolution of the first images.

As in the first embodiment, by setting the first images to be color images, the second images to be monochrome images, setting the first images to be images obtained by reading all of the pixels, setting the second images to be images with low resolution, causing the first images to include all of the imaging tiles (divided regions), and causing the second images to include some of the imaging tiles (divided regions), it is possible to obtain the advantages of shortening the calculation time, reducing the calculation cost, reducing the required capacity of data, and reducing power consumption.

By using, as the second image, a high-contrast monochrome image that is generated based on the brightness information of a color obtained by the staining the sample, it is possible to obtain the advantage of maintaining the feature amount extraction accuracy while reducing the capacity of the data. By sequentially acquiring the second images and the first images temporally and thus acquiring the second images prior to the first images, the extraction of the feature amount and the acquisition of the first images can be performed simultaneously, and thus the processing time until the merging can be shortened.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-67614, filed on Mar. 23, 2012, which is hereby incorporated by reference herein in its entirety.

What is claimed is:

1. A method of controlling an imaging apparatus that images an imaging target region by dividing the imaging target region into a plurality of divided regions and generates a merged image of a larger region than the divided regions by merging the obtained images in the respective divided regions, the method comprising the steps of:

acquiring a first image and a second image in each of the plurality of divided regions;

generating a correction parameter from a relative position deviation amount between the second images of adjacent divided regions using the second images; and generating the merged image by correcting the first images of the adjacent divided regions using the correction parameter and merging the corrected first images, wherein the second image is an image in which a depth of field or a focusing position, or both, are different from those of the first image.

2. The method according to claim 1, wherein the second image is an image having the deeper depth of field than the first image.

3. The method according to claim 2, wherein the second image is acquired temporally prior to the first image.

4. The method according to claim 2, wherein in the generating of the merged image, when contrast of the first image of a given divided region is equal to or less than a threshold value, the second image is used for the merging, instead of the first image, in this divided region.

5. The method according to claim 2, wherein in the generating of the merged image, when contrast of the second image of a given divided region is greater than contrast of the first image, the second image is used for the merging, instead of the first image, in this divided region.

6. The method according to claim 2, further comprising: a step of determining, for each of the divided regions, whether a range of a corrugation of a sample surface is within a depth of field, wherein in the divided region for which the range of the corrugation of the sample surface is determined to be within the depth of field, the second image is not acquired and the first image is used for the alignment, instead of the second image.

7. The method according to claim 6, wherein an image of a first divided region for which the range of the corrugation of the sample surface is determined to be within the depth of field is acquired temporally prior to an image of a second divided region for which the range of the corrugation of the sample surface is determined not to be within the depth of field.

8. The method according to claim 1, wherein the second image is an image selected from a plurality of images with different focusing positions.

9. The method according to claim 8, further comprising: a step of determining, for each of the divided regions, an image having higher contrast among the plurality of images with the different focusing positions, and selecting the image determined to have the highest contrast among the plurality of images as the second image.

10. The method according to claim 8, further comprising: a step of determining, for each of the divided regions, an image having a depth of field within which the range of the corrugation of the sample surface falls, among the plurality of images with the different focusing positions, and selecting the image determined to have the depth of field within which the range of the corrugation of the sample surface falls among the plurality of images as the second image.

11. The method according to claim 1, wherein the first image is a color image and the second image is a monochrome image.

12. The method according to claim 11, wherein the imaging target region includes a stained sample, and the second image is a monochrome image generated from brightness information of a color obtained by staining.

13. The method according to claim 1, wherein the second image is an image having lower resolution than the first image.

14. The method according to claim 1, wherein the second image is an image of only a part of the divided region.

15. An imaging apparatus that images an imaging target region by dividing the imaging target region into a plurality of divided regions and generates a merged image of a larger region than the divided regions by merging the obtained images in the respective divided regions, the imaging apparatus comprising:

at least one memory configured to store a first image and a second image in each of the plurality of divided regions; and at least one processor coupled to said memory and operating to:

generate a correction parameter from a relative position deviation amount between the second images of adjacent divided regions; and generate the merged image by correcting the first images of the adjacent divided regions using the correction parameter and merging the corrected first images, wherein the second image is an image in which a depth of field or a focusing position, or both, are different from those of the first image.

* * * * *